United States Patent
Sawai et al.

(10) Patent No.: US 7,762,513 B2
(45) Date of Patent: Jul. 27, 2010

(54) DISPLAY SCREEN TURNING APPARATUS

(75) Inventors: Kunio Sawai, Daito (JP); Toshiharu Hibi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 255 days.

(21) Appl. No.: 11/935,628

(22) Filed: Nov. 6, 2007

(65) Prior Publication Data
US 2008/0105070 A1 May 8, 2008

(30) Foreign Application Priority Data
Nov. 7, 2006 (JP) ............................. 2006-301107

(51) Int. Cl.
A47B 91/00 (2006.01)
(52) U.S. Cl. ............... 248/349.1; 248/917; 74/425; 74/412 R; 74/412 TA; 74/827; 348/836; 348/E5.128; 361/679.06
(58) Field of Classification Search .......... 248/349.1, 248/521, 458, 130, 131, 917; 108/139, 20, 108/103; 348/836, E5.132, E5.128; 74/434, 74/425, 473.1, 412 R, 412 TA, 827; 361/679.06, 361/679.01, 807
See application file for complete search history.

(56) References Cited

U.S. PATENT DOCUMENTS

| | | | | |
|---|---|---|---|---|
| 2,847,175 A * | 8/1958 | Farley et al. | ................... | 47/40.5 |
| 4,905,543 A * | 3/1990 | Choi | ........................... | 74/827 |
| 5,749,556 A * | 5/1998 | Matsuoka et al. | ......... | 248/349.1 |
| 7,384,021 B2 * | 6/2008 | Liao | ............................. | 248/415 |
| 7,436,140 B2 * | 10/2008 | Takaji et al. | ................. | 318/466 |
| 2005/0194509 A1 * | 9/2005 | Tsai et al. | .................. | 248/349.1 |
| 2007/0215760 A1 * | 9/2007 | Sawai et al. | ............... | 248/122.1 |
| 2008/0035821 A1 * | 2/2008 | Kameoka et al. | .......... | 248/349.1 |
| 2008/0083293 A1 * | 4/2008 | Sawai | ...................... | 74/412 TA |
| 2008/0100997 A1 * | 5/2008 | Chen | ........................... | 361/681 |
| 2008/0185484 A9 * | 8/2008 | Suzuki | .................... | 248/125.7 |

FOREIGN PATENT DOCUMENTS

| | | |
|---|---|---|
| EP | 1 477 845 A1 | 11/2004 |
| JP | 63-569 U | 1/1988 |
| JP | 6-225245 A | 8/1994 |
| JP | 2003-54322 A | 2/2003 |
| JP | 2004-258055 A | 9/2004 |
| JP | 2004-304679 A | 10/2004 |

OTHER PUBLICATIONS

European Search Report dated Sep. 4, 2009 (six (6) pages).

* cited by examiner

*Primary Examiner*—Anita M King
(74) *Attorney, Agent, or Firm*—Crowell & Moring LLP

(57) ABSTRACT

A display screen turning apparatus includes a base portion for placing a display screen portion thereon, a transmission gear portion for transmitting driving force of a driving source arranged inside the base portion, a display screen support member supporting the display screen portion rotatably in a horizontal plane and a vertical plane, a rack plate arranged on the base portion and including a rack gear meshed with the transmission gear portion in a horizontal direction, and a coupling portion rotatably coupling the rack plate in the horizontal plane with respect to the display screen support member. The display screen support member is rotated in the anteroposterior direction with respect to the vertical plane by a prescribed angle through the coupling portion coupled to the rack plate following reciprocation of the rack plate in the horizontal plane with normal and reverse rotation of the driving source.

15 Claims, 23 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a base portion for placing a display screen portion.

2. Description of the Background Art

A display screen turning apparatus comprising a base portion for placing a display screen portion is known in general, as disclosed in Japanese Patent Laying-Open Nos. 6-225245 (1994), 2004-258055 and 2004-304679, for example.

The aforementioned Japanese Patent Laying-Open No. 6-225245 discloses a projection television (display) comprising a tilt mechanism (display screen turning apparatus) including a tilt drive motor fixed on an upper surface of a tilting base (base portion), a tilt gear train (transmission gear portion) and an arcuate rack gear fixed with a gear portion with the bottom down on the bottom of the projection television body (display screen portion), a plurality of tilting rollers rotatably provided on the bottom of the projection television body and a tilting guide provided on the upper surface of the tilting base (base portion). In this projection television (display), the projection television body (display screen portion) is placed on the tilting base (base portion) in a state where the plurality of tilting rollers are rotatably fitted into grooves of the tilting guide, and the driving force of the tilt drive motor is transmitted to the rack gear through the tilt gear train (transmission gear portion) located below the rack gear so that the projection television body (display screen portion) can turn on the tilting base (base portion) in a vertical direction.

The aforementioned Japanese Patent Laying-Open Nos. 2004-258055 and 2004-304679 each disclose an electric rotary mechanism for a display comprising a tilt mechanism including a horizontally long support frame having a groove and rotatably supporting a support plate provided on a lower back surface of a display along with the display in a vertical direction, an electric motor and a reducing gear (transmission gear portion) mounted on the support frame in an upright direction, a rotating arm with a first end fixed on a drive shaft closer to the reducing gear (transmission gear portion) and a coupling arm with a first end rotatably coupling to the support plate. In this electric rotary mechanism for a display, second ends of the rotating and coupling arms are rotatably coupled to each other with a shaft member and the driving force of the electric motor is transmitted to the rotating arm, the coupling arm and the support plate in this order through the reducing gear (transmission gear portion) so that the display (display screen portion) can turn on the support frame along with the support plate in a vertical direction.

In the projection television (display) comprising the conventional tilt mechanism (display screen turning apparatus) proposed in the aforementioned Japanese Patent Laying-Open No. 6-225245, however, the own weight of the projection television body (display screen portion) is conceivably applied to the tilting base (base portion) through the tilting rollers and the tilting guide, while the rack gear meshes so as to cover the tilt gear train (transmission gear portion) from above and hence the load from the projection television body (display screen portion) is conceivably applied also to the tilt gear train (transmission gear portion). Therefore, it is disadvantageously difficult that the tilt gear train (transmission gear portion) smoothly transmits the driving force of the tilt gear train (transmission gear portion), due to the load applied from the projection television body (display screen portion).

In the conventional electric rotary mechanism for a display proposed in each of the aforementioned Japanese Patent Laying-Open Nos. 2004-258055 and 2004-304679, the reducing gear (transmission gear portion) is conceivably designed such that a plurality of gears having a large gear ratio are combined with respect to the electric motor driving at a high speed to reduce its speed by a low rotational speed in order to turn the display (display screen portion). Therefore, in view of sizes of the members of the reducing gear (transmission gear portion) including the electric motor, it is disadvantageously difficult in design that the reducing gear (transmission gear portion) and the electric motor are provided on the horizontally long support frame in an upright manner.

SUMMARY OF THE INVENTION

The present invention has been proposed in order to solve the aforementioned problems and an object of the present invention is to provide a display screen turning apparatus capable of smoothly transmitting driving force of a transmission gear portion and easily arranging the transmission gear portion large in size.

A display screen turning apparatus according to a first aspect of the present invention comprises a base portion for placing a display screen portion thereon, a driving source arranged inside the base portion, a transmission gear portion for transmitting driving force of the driving source, arranged inside the base portion, a display screen support member supporting the display screen portion rotatably in a horizontal plane and rotatably in an anteroposterior direction with respect to a vertical plane, a rack plate arranged on the base portion and including a rack gear meshed with the transmission gear portion in a horizontal direction, and a coupling portion rotatably coupling the rack plate in the horizontal plane with respect to the display screen support member, wherein the display screen support member is rotated in the anteroposterior direction with respect to the vertical plane by a prescribed angle through the coupling portion coupled to the rack plate following reciprocation of the rack plate in the horizontal plane with normal and reverse rotation of the driving source.

As hereinabove described, the display screen turning apparatus according to the first aspect of this invention comprises the driving source arranged inside the base portion and the transmission gear portion for transmitting the driving force of the driving source, arranged inside the base portion, whereby both the transmission gear portion difficult to be downsized and the driving source of the transmission gear portion can be housed inside the base portion and hence the transmission gear portion large in size can be easily arranged. The display screen turning apparatus comprises the display screen support member supporting the display screen portion rotatably in the horizontal plane and rotatably in the anteroposterior direction with respect to the vertical plane, the rack plate arranged on the base portion and including the rack gear meshed with the transmission gear portion in the horizontal direction and the coupling portion coupling the rack plate rotatably in the horizontal plane with respect to the display screen support member, and the display screen support member rotates in the anteroposterior direction by the prescribed angle with respect to the vertical plane through the coupling portion coupled to the rack plate following reciprocation of the rack plate in the horizontal plane by the normal and reverse rotation of the driving source, whereby the own weight of the display screen portion is applied to the display screen support member regardless of the time of the stop of the display screen portion and the time of the turning operation of the display screen portion, while not applied to the transmission gear portion meshed through the rack plate and the rack gear in the horizontal direction, and hence the driving force of the transmission gear portion can be smoothly transmitted.

The aforementioned display screen turning apparatus according to the first aspect preferably further comprises a support shaft provided on the base portion and reciprocably supporting the rack plate in the horizontal plane, wherein the rack plate is movably supported with respect to the support shaft so that the rack plate can be reciprocated in the horizontal plane. According to this structure, the rack plate is reciprocated through the rack gear in the state of being supported by the support shaft and hence the display screen support member engaged with the rack plate can be stably rotated.

In the aforementioned display screen turning apparatus according to the first aspect, the rack plate preferably includes a slot-shaped support hole extending substantially parallel to a direction in which the rack plate reciprocates in the horizontal plane, and the support hole is preferably inserted into the support shaft on the base portion so that the rack plate is movably supported with respect to the support shaft. According to this structure, the rack plate can be reciprocated limiting in the range of the longitudinal length of the support hole receiving the support shaft on the base portion and hence the display screen support member can be easily rotated in the anteroposterior direction by the prescribed angle.

In the aforementioned display screen turning apparatus according to the first aspect, the rack plate is preferably swingable in the horizontal plane following rotation of the display screen support member in the horizontal plane in addition to reciprocation in the horizontal plane. According to this structure, the rack plate can be swung in the horizontal plane in addition to the reciprocation in the horizontal plane also when the display screen support member is rotated in the anteroposterior direction with respect to the vertical plane in the state where the display screen support member is rotated in the horizontal plane and hence the display screen support member can be easily rotated in the anteroposterior direction without deforming the rack plate due to twist.

In the aforementioned display screen turning apparatus according to the first aspect, the rack gear preferably has a gear portion meshed with the transmission gear portion in the horizontal direction, a fixing portion for fixing the rack gear to the rack plate, and a connecting portion connecting the gear portion and the fixing portion so as to allow change of a distance between the gear portion and the fixing portion. According to this structure, the connecting portion of the rack gear fixed to the rack plate absorbs the change of the distance between the gear portion and the fixing portion when the rack plate swings following the turn of the display screen support member in the horizontal plane in addition to the reciprocation in the horizontal plane and hence the rack plate can be swung without applying excessive external force to the mesh between the transmission gear portion and the rack gear. Thus, reliability of the display screen turning apparatus can be improved.

In this case, a region connecting the gear portion and the fixing portion in the rack gear is preferably cut out into a prescribed shape so that the connecting portion of the rack gear has an elastically deformable shape. According to this structure, the elastically deformable connecting portion can be integrally formed with the rack gear dissimilarly to a case of separately providing a dedicated elastically deformable member to the rack gear and hence the number of the components can be inhibited from increase.

In the aforementioned display screen turning apparatus according to the first aspect, the transmission gear portion preferably includes a torque limiter interrupting the driving force of the driving source when the driving force of the driving source exceeds a prescribed value. According to this structure, the driving force of the driving source continuously rotating can be interrupted with the torque limiter when the vertical turn of the display screen portion is stopped by abrupt external force or the like, or when the turning angle of the display screen portion reaches maximum value to stop the turning operation, and hence the driving force of the driving source can not be transmitted to the transmission gear portion. Therefore, the transmission gear portion can be inhibited from being broken due to excessive rotation when the driving force of the driving source exceeds the prescribed torque.

In the aforementioned display screen turning apparatus according to the first aspect, the driving source preferably transmits the driving force of the driving source to the transmission gear portion through a worm gear provided on a driving axis of the driving source. According to this structure, the worm gear can not be rotated with rotation of the gears also when the respective gears constituting the transmission gear portion are sequentially driven following the turn of the display screen portion due to abrupt external force and hence the driving source can be inhibited from reversely driving with driving force other than the driving force of the driving source.

In the aforementioned display screen turning apparatus according to the first aspect, the display screen support member preferably includes a first hole to which the coupling portion is coupled, and the first hole of the display screen support member is preferably provided on a vertical segment passing a rotation center in the horizontal plane of the display screen support member. According to this structure, the coupling portion is located on the rotation center in the horizontal plane of the display screen support member also when the display screen portion rotates (turns) in the horizontal plane and hence the rack plate does not swing in the direction intersecting with the moving direction in the horizontal plane. The coupling portion starts moving (rotating) in the direction for rotating the display screen portion in the anteroposterior direction with reference to the rotation center in rotating in the horizontal plane only when the display screen portion rotates (turns) in the anteroposterior direction with respect to the vertical plane from the state of rotating (turning) in the horizontal plane, and hence the rack plate coupled to the coupling portion moves (swings) in the swing range in which substantial forward and rearward directions are substantially equal to each other with reference to the rotation center at which the coupling portion starts moving. Therefore, the swing range of the rack plate in the horizontal plane when turning the display screen portion in the anteroposterior direction can be minimally-suppressed.

In the aforementioned display screen turning apparatus according to the first aspect, the rack plate preferably further includes a second hole supporting the coupling portion rotatably in the horizontal plane and rotatably in the anteroposterior direction with respect to the vertical plane, and an inner side surface of the second hole of the rack plate is preferably formed in a tapered shape such that the hole size thereof increases toward the display screen support member when coupling the rack plate and the display screen support member with the coupling portion. According to this structure, the coupling portion is easily rotated in the anteroposterior direction with respect to the vertical plane due to the shape of the inner side surface of the second hole of the rack plate when rotating the display screen portion in the anteroposterior direction with respect to the vertical plane. Therefore, the display screen support member can smoothly rotate in the state where the rack plate and the display screen support member are coupled with the coupling portion.

A display screen turning apparatus according to a second aspect of the present invention comprises a base portion for placing a display screen portion thereon, a driving source arranged inside the base portion, a transmission gear portion for transmitting driving force of the driving source through a worm gear provided on a driving axis of the driving source, arranged inside the base portion and including a torque limiter interrupting the driving force of the driving source when the driving force of the driving source exceeds a prescribed value, a display screen support member provided with a first hole and supporting the display screen portion rotatably in a horizontal plane and rotatably in an anteroposterior direction with respect to a vertical plane, a rack plate arranged on the base portion and including a rack gear meshed with the transmission gear portion in a horizontal direction and a second hole, and a coupling portion rotatably coupling the rack plate in the horizontal plane with respect to the display screen support member through the first hole and the second hole, wherein the display screen support member is rotated in the anteroposterior direction with respect to the vertical plane by a prescribed angle through the coupling portion coupled to the rack plate following reciprocation of the rack plate in the horizontal plane with normal and reverse rotation of the driving source, the rack plate is swingable in the horizontal plane following rotation of the display screen support member in the horizontal plane in addition to reciprocation in the horizontal plane, the first hole of the display screen support member is provided on a vertical segment passing a rotation center in the horizontal plane of the display screen support member, and the second hole of the rack plate supports the coupling portion rotatably in the horizontal plane and rotatably in the anteroposterior direction with respect to the vertical plane and an inner side surface of the second hole is formed in a tapered shape such that the hole size thereof increases toward the display screen support member.

As hereinabove described, the display screen turning apparatus according to the second aspect of the present invention comprises the driving source arranged inside the base portion and the transmission gear portion for transmitting the driving force of the driving source, arranged inside the base portion, whereby both the transmission gear portion difficult to be downsized and the driving source of the transmission gear portion can be housed inside the base portion and hence the transmission gear portion large in size can be easily arranged. The display screen turning apparatus comprises the display screen support member supporting the display screen portion rotatably in the horizontal plane and rotatably in the anteroposterior direction with respect to the vertical plane, the rack plate arranged on the base portion and including the rack gear meshed with the transmission gear portion in the horizontal direction and the coupling portion coupling the rack plate rotatably in the horizontal plane with respect to the display screen support member, and the display screen support member rotates in the anteroposterior direction by the prescribed angle with respect to the vertical plane through the coupling portion coupled to the rack plate following reciprocation of the rack plate in the horizontal plane by the normal and reverse rotation of the driving source, whereby the own weight of the display screen portion is applied to the display screen support member regardless of the time of the stop of the display screen portion and the time of the turning operation of the display screen portion, while not applied to the transmission gear portion meshed through the rack plate and the rack gear in the horizontal direction, and hence the driving force of the transmission gear portion can be smoothly transmitted.

In the display screen turning apparatus according to the second aspect, the rack plate is swingable in the horizontal plane following rotation of the display screen support member in the horizontal plane in addition to reciprocation in the horizontal plane, whereby the rack plate can be swung in the horizontal plane in addition to the reciprocation in the horizontal plane also when the display screen support member is rotated in the anteroposterior direction with respect to the vertical plane in the state where the display screen support member is rotated in the horizontal plane and hence the display screen support member can be easily rotated in the anteroposterior direction without deforming the rack plate due to twist. The transmission gear portion includes a torque limiter interrupting the driving force of the driving source when the driving force of the driving source exceeds a prescribed value, whereby the driving force of the driving source continuously rotating can be interrupted with the torque limiter when the vertical turn of the display screen portion is stopped by abrupt external force or the like, or when the turning angle of the display screen portion reaches maximum value to stop the turning operation, and hence the driving force of the driving source can not be transmitted to the transmission gear portion. Therefore, the transmission gear portion can be inhibited from being broken due to excessive rotation when the driving force of the driving source exceeds the prescribed torque. The driving source transmits the driving force of the driving source to the transmission gear portion through a worm gear provided on a driving axis of the driving source, whereby the worm gear can not be rotated with rotation of the gears also when the respective gears constituting the transmission gear portion are sequentially driven following the turn of the display screen portion due to abrupt external force and hence the driving source can be inhibited from reversely driving with driving force other than the driving force of the driving source.

In the aforementioned display screen turning apparatus according to the second aspect, the display screen support member includes a first hole to which the coupling portion is coupled, and the first hole of the display screen support member is provided on a vertical segment passing a rotation center in the horizontal plane of the display screen support member, whereby the coupling portion is located on the rotation center in the horizontal plane of the display screen support member also when the display screen portion rotates (turns) in the horizontal plane and hence the rack plate does not swing in the direction intersecting with the moving direction in the horizontal plane. The coupling portion starts moving (rotating) in the direction for rotating the display screen portion in the anteroposterior direction with reference to the rotation center in rotating in the horizontal plane only when the display screen portion rotates (turns) in the anteroposterior direction with respect to the vertical plane from the state of rotating (turning) in the horizontal plane, and hence the rack plate coupled to the coupling portion moves (swings) in the swing range in which substantial forward and rearward directions are substantially equal to each other with reference to the rotation center at which the coupling portion starts moving. Therefore, the swing range of the rack plate in the horizontal plane when turning the display screen portion in the anteroposterior direction can be minimally-suppressed. The rack plate further includes a second hole supporting the coupling portion rotatably in the horizontal plane and rotatably in the anteroposterior direction with respect to the vertical plane, and an inner side surface of the second hole of the rack plate is formed in a tapered shape such that the hole size thereof increases toward the display screen support member when coupling the rack plate and the display screen support member with the coupling portion, whereby the coupling portion is easily rotated in the anteroposterior direction with respect to the vertical plane due to the shape of the inner side surface of the second hole of the rack plate when rotating the display screen portion in the anteroposterior direction with respect to the vertical plane. Therefore, the display screen support member can smoothly rotate in the state where the rack plate and the display screen support member are coupled with the coupling portion.

In the aforementioned display screen turning apparatus according to the second aspect preferably further comprises a support shaft provided on the base portion and reciprocably supporting the rack plate in the horizontal plane, wherein the rack plate is preferably movably supported with respect to the support shaft so that the rack plate can be reciprocated in the horizontal plane. According to this structure, the rack plate is reciprocated through the rack gear in the state of being supported by the support shaft and hence the display screen support member engaged with the rack plate can be stably rotated.

In the aforementioned display screen turning apparatus according to the second aspect, the rack plate preferably includes a slot-shaped support hole extending substantially parallel to a direction in which the rack plate reciprocates in the horizontal plane, and the support hole is preferably inserted into the support shaft on the base portion so that the rack plate is movably supported with respect to the support shaft. According to this structure, the rack plate can be reciprocated limiting in the range of the longitudinal length of the support hole receiving the support shaft on the base portion and hence the display screen support member can be easily rotated in the anteroposterior direction by the prescribed angle.

In the aforementioned display screen turning apparatus according to the second aspect, the rack gear preferably has a gear portion meshed with the transmission gear portion in the horizontal direction, a fixing portion for fixing the rack gear to the rack plate, and a connecting portion connecting the gear portion and the fixing portion so as to allow change of a distance between the gear portion and the fixing portion. According to this structure, the connecting portion of the rack gear fixed to the rack plate absorbs the change in the distance between the gear portion and the fixing portion when the rack plate swings following the turn of the display screen support member in the horizontal plane in addition to the reciprocation in the horizontal plane and hence the rack plate can be swung without applying excessive external force to the mesh between the transmission gear portion and the rack gear. Thus, reliability of the display screen turning apparatus can be improved.

In this case, a region connecting the gear portion and the fixing portion in the rack gear is preferably cut out into a prescribed shape so that the connecting portion of the rack gear has an elastically deformable shape. According to this structure, the elastically deformable connecting portion can be integrally formed with the rack gear dissimilarly to a case of separately providing a dedicated elastically deformable member to the rack gear and hence the number of the components can be inhibited from increase.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

Structures of a liquid crystal television 100 provided with a display screen turning apparatus 20 and the display screen turning apparatus 20 according to the embodiment of the present invention will be now described with reference to FIGS. 1 to 17. The embodiment of the present invention is applied to the display screen turning apparatus of the liquid crystal television, which is an exemplary display.

Figure 1:
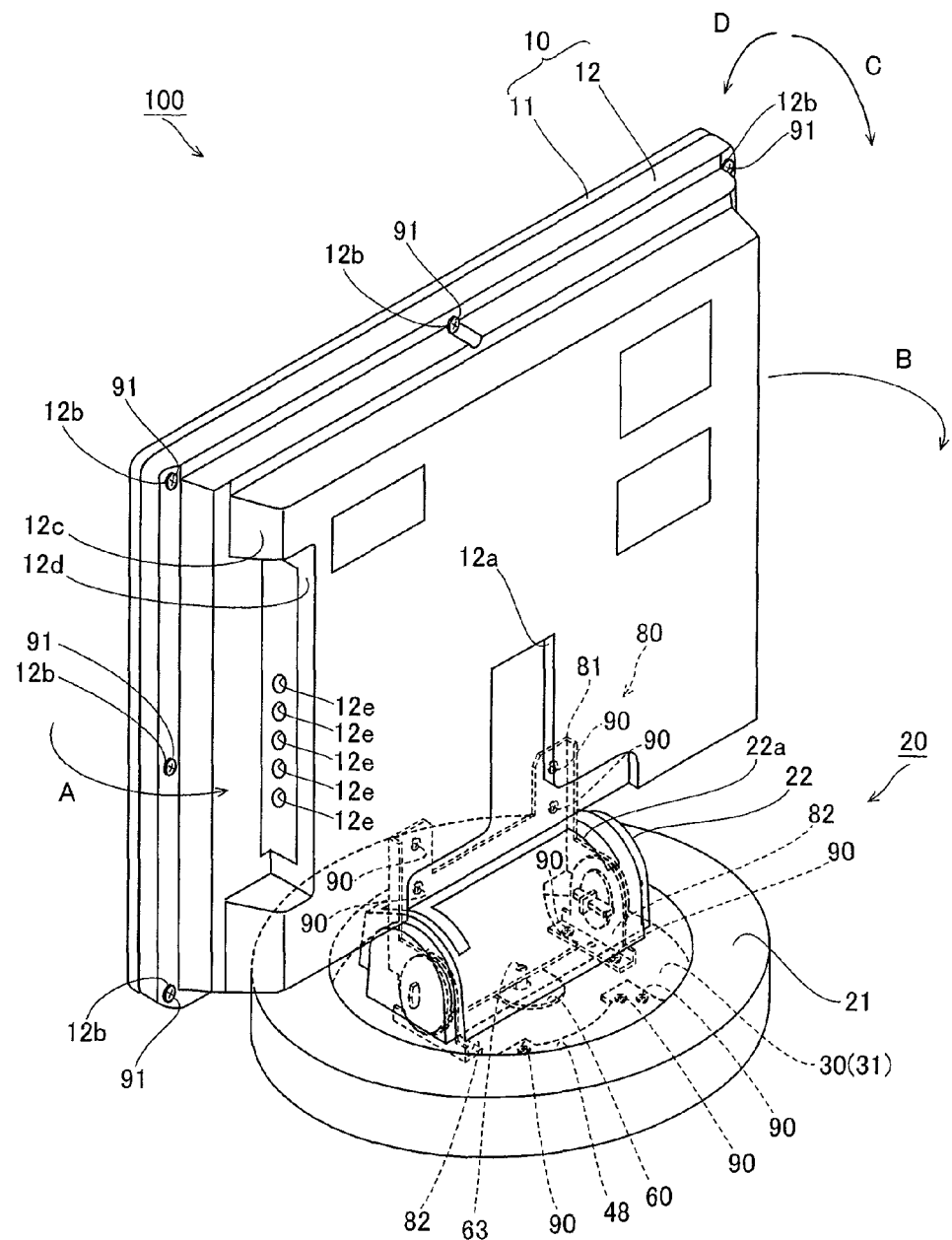
FIG. 1 is a perspective view showing an overall structure of a liquid crystal television provided with a display screen turning apparatus according to an embodiment of the present invention.

As shown in FIG. 1, the display screen turning apparatus 20 according to the embodiment of the present invention is so provided as to be a turntable display body 10 of the liquid crystal television 100 supported with a display screen support mechanism 80 in a horizontal direction (along arrows A and B) in a horizontal plane by a prescribed angle (±30° in this embodiment) and incline the display body 10 in an anteroposterior direction (along arrows C and D) with respect to a vertical plane by a prescribed angle (±10° in this embodiment). The display body 10 is an example of the "display screen portion" in the present invention.

Figure 2:
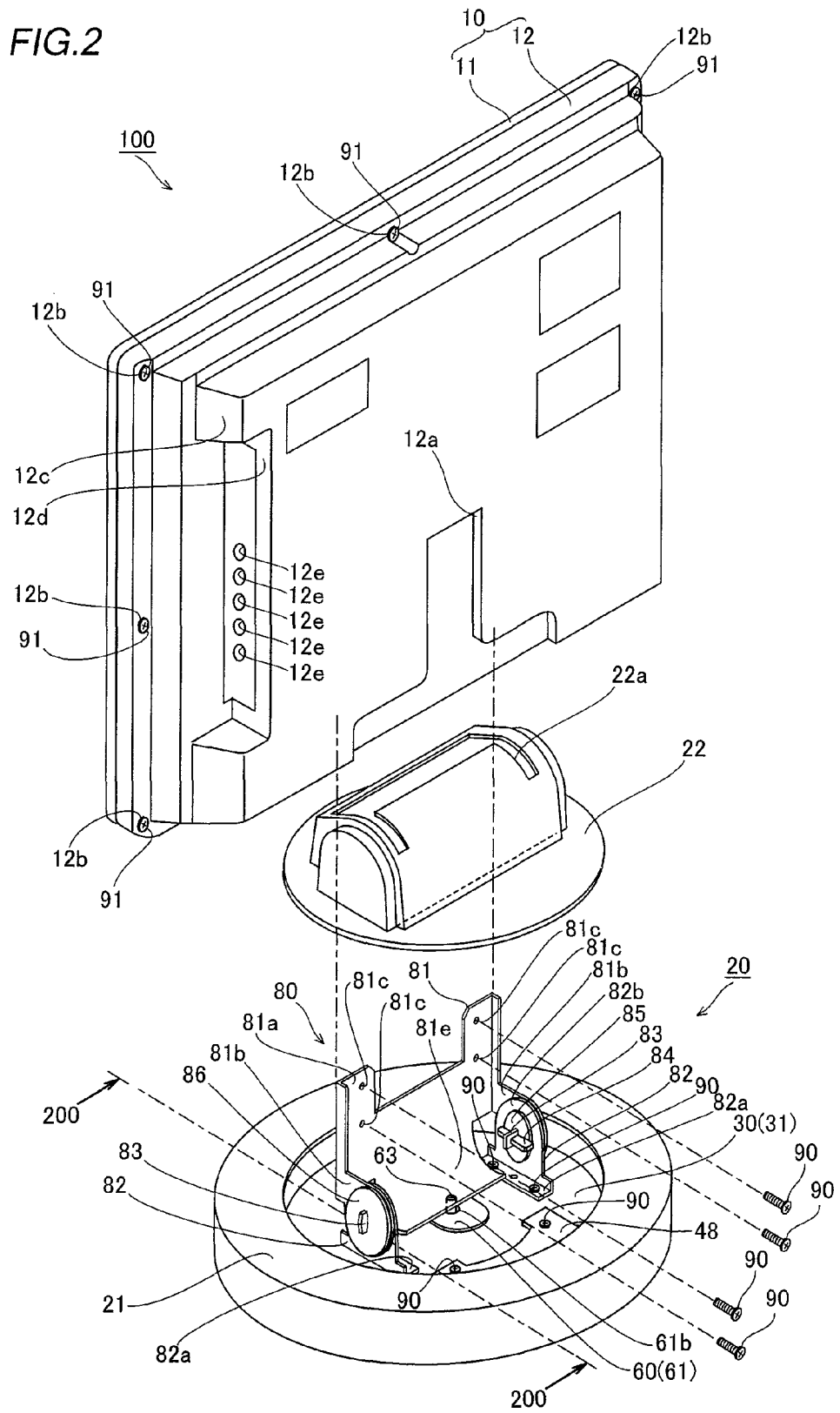
FIG. 2 is an exploded perspective view of the liquid crystal television provided with the display screen turning apparatus according to the embodiment of the present invention shown in FIG. 1.
Figure 3:
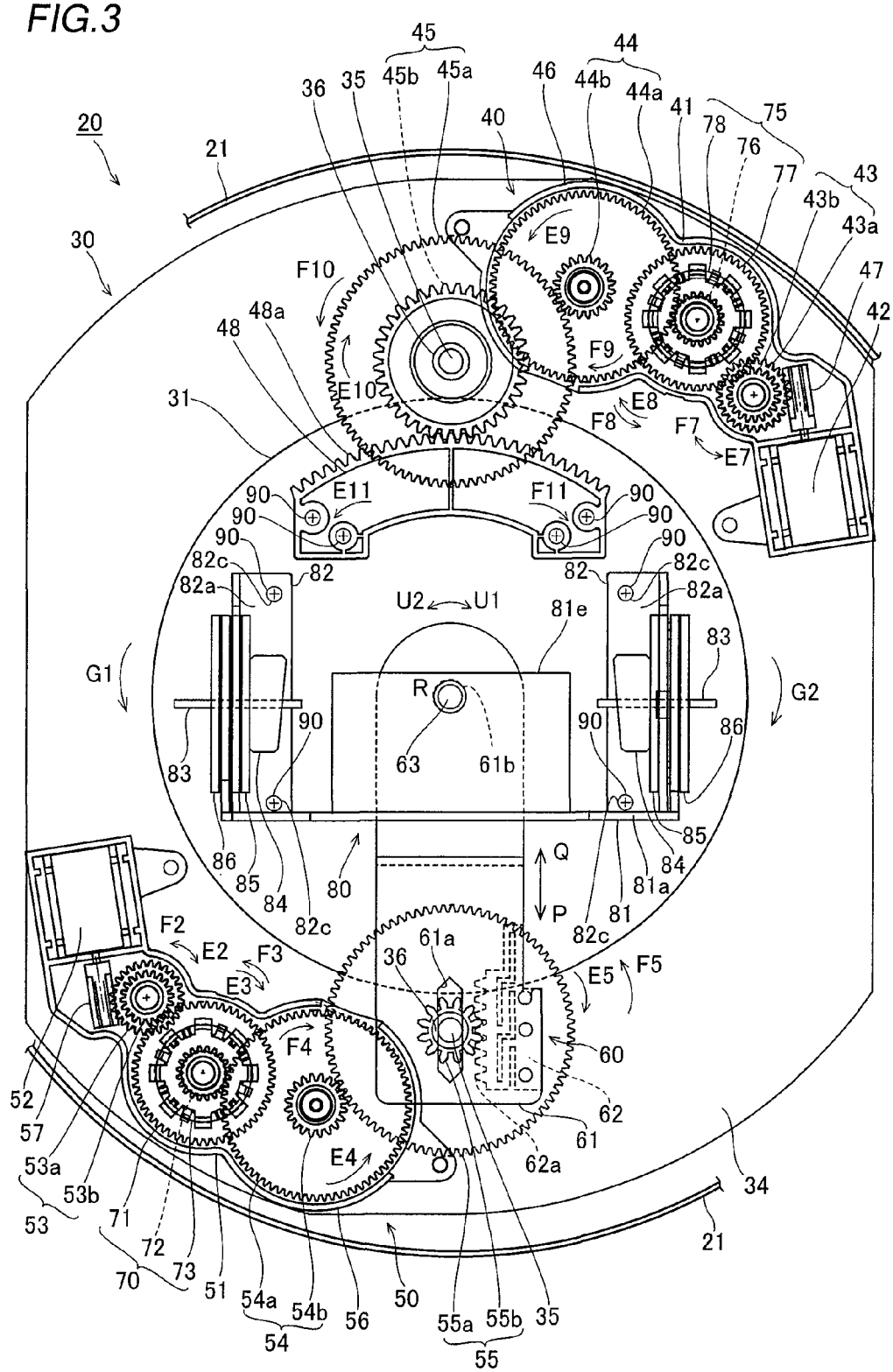
FIG. 3 is a plan view of the display screen turning apparatus according to the embodiment of the present invention shown in FIG. 1.

As shown in FIG. 3, the display screen turning apparatus 20 comprises a base portion 30 for turning the display body 10 (see FIG. 1) supported with the display screen support mechanism 80 (see FIG. 2) in the horizontal direction (along arrows A and B) in the horizontal plane, a horizontal turn driving portion 40 turning an after-mentioned turning plate 31 arranged on the base portion 30 in the horizontal direction (along arrows A and B in FIG. 1) and controlling the turning angle of the turning plate 31, and a vertical turn driving portion 50 turning the display body 10 (see FIG. 2) supported with the display screen support mechanism 80 (see FIG. 2) in the anteroposterior direction (along arrows C and D FIG. 1) with respect to the vertical plane by the prescribed angle and controlling the turning angle of the display screen support mechanism 80 (see FIG. 2).

Figure 4:
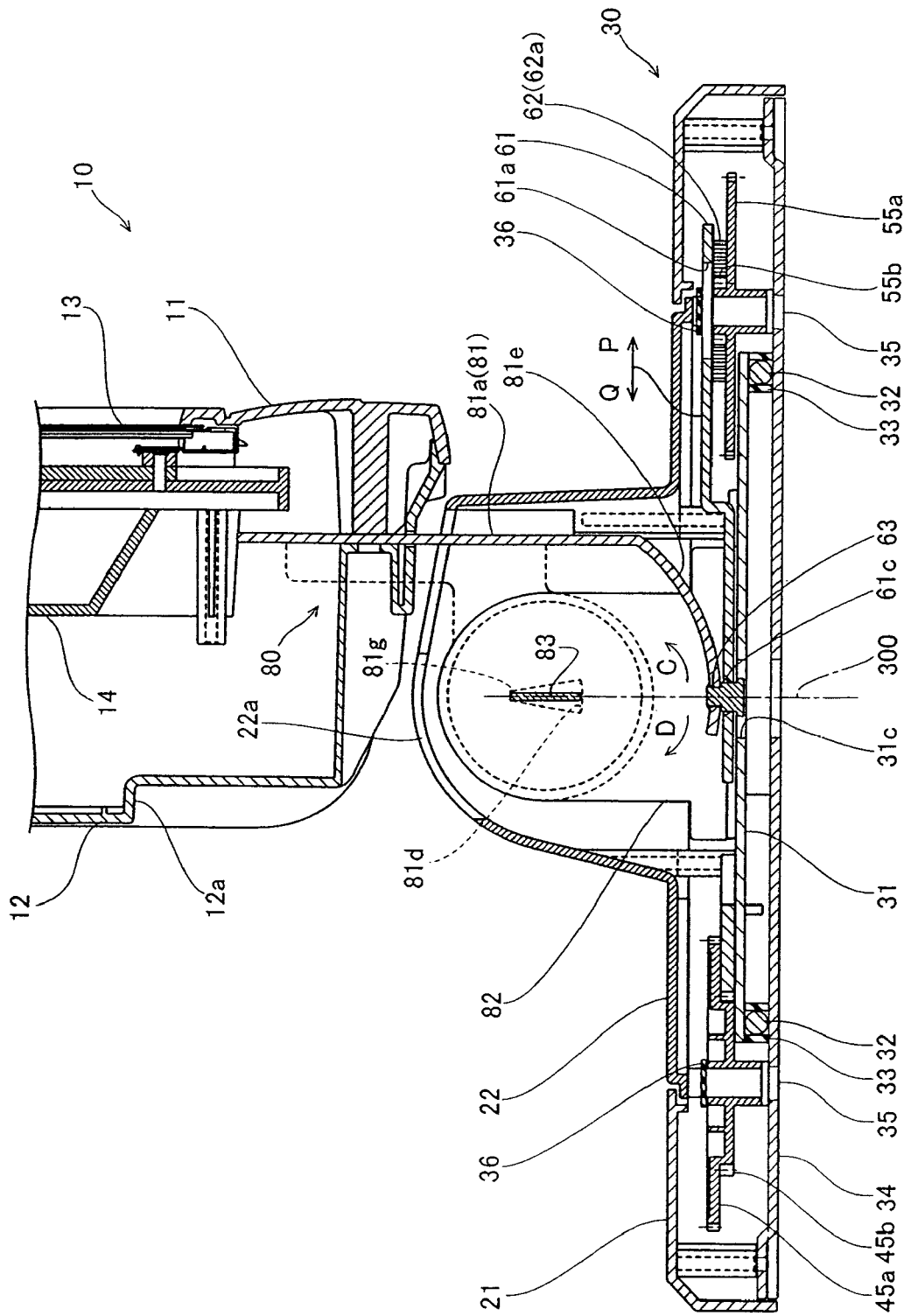
FIG. 4 is a sectional view for illustrating the structure of the display screen turning apparatus according to the embodiment of the present invention shown in FIG. 1.
Figure 5:
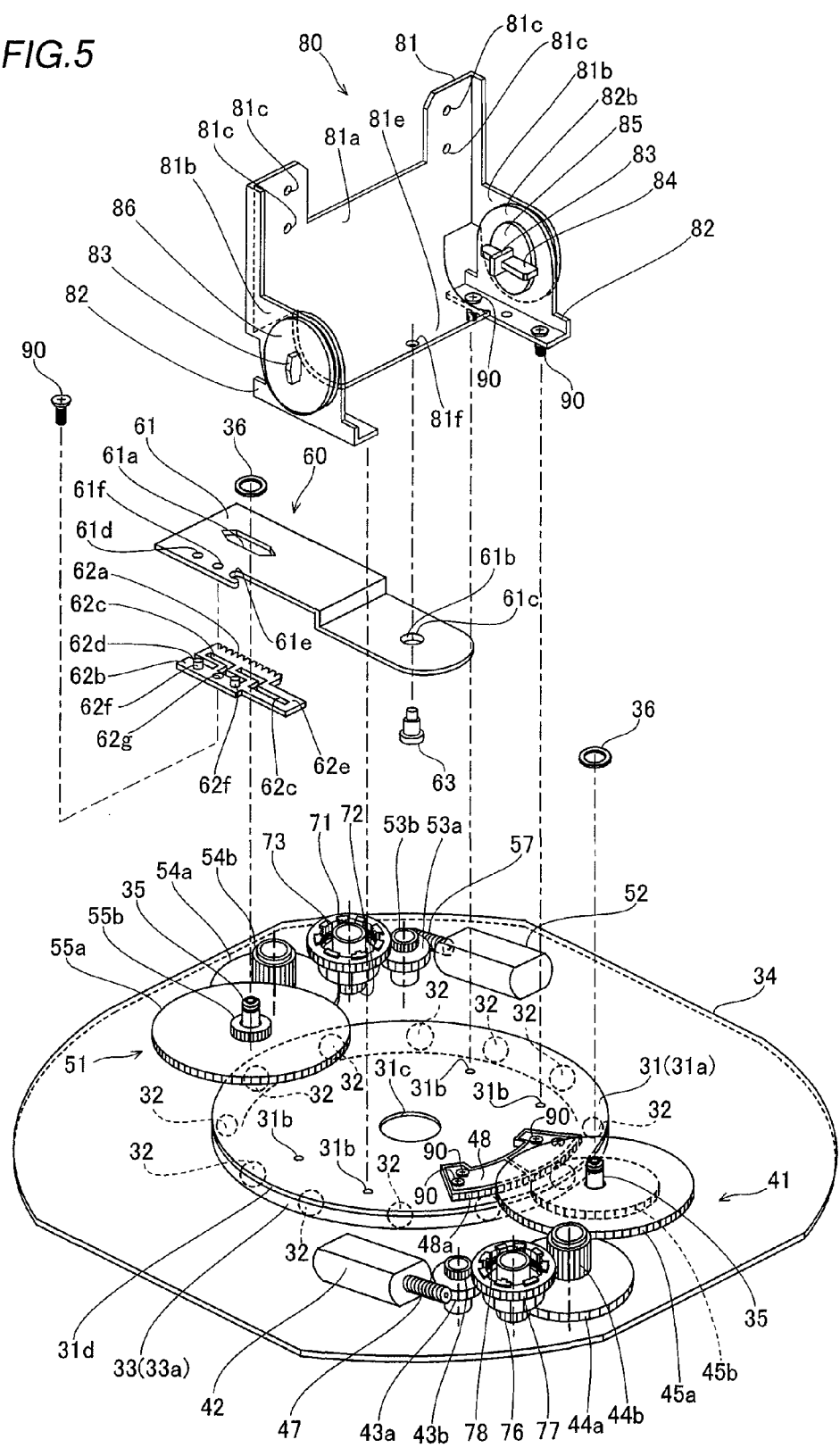
FIG. 5 is an exploded perspective view for illustrating the display screen turning apparatus according to the embodiment of the present invention shown in FIG. 1 in detail.

As shown in FIGS. 3 to 5, the base portion 30 is constituted by the turning plate 31 made of sheet metal mounted with the display screen support mechanism 80 (see FIG. 2), a guide member 33 (see FIG. 5) made of resin arranged with a plurality of steel balls 32 (see FIG. 5) (twelve in this embodiment) therein at prescribed intervals (at intervals of about 30° in this embodiment) and rotatably holding the steel balls 32 (see FIG. 5), a base member 34 made of sheet metal, a support member (not shown) made of metal rotatably supporting the turning plate 31 on the base member 34, boss members 35 made of resin rotatably receiving rotation axes of after-mentioned gears 45 and 55 and reciprocably receiving an after-mentioned rack plate 60 of the vertical turn driving portion 50 in the horizontal plane, and stop ring members 36 of the rack plate 60 inserted around the gears 45 and 55 and the boss members 35. The boss member 35 is an example of the "support shaft" in the present invention.

According to this embodiment, the vertical turn driving portion 50 is constituted by a transmission gear portion 51 constituted of a plurality of gear members, a stepping motor 52 serving as a driving source of the transmission gear portion 51, the rack plate 60 for rotating an after-mentioned display screen support member 81 rotatably provided in the display screen support mechanism 80 mounted on the turning plate 31 of the base portion 30 in the anteroposterior direction (along arrows C and D FIG. 1) with respect to the vertical plane, as shown in FIGS. 3 and 5. The vertical turn driving portion 50 is so formed as to be arranged in the base portion 30 as shown in FIG. 3 to 5. The stepping motor 52 is an example of the "driving source" in the present invention.

Figure 8:
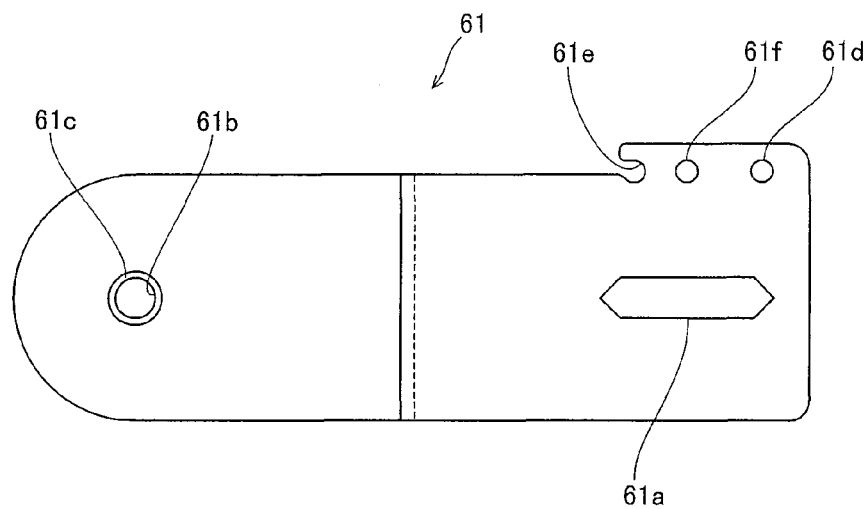
FIG. 8 is a diagram showing a plate member of a rack plate according to the embodiment of the present invention shown in FIG. 1.
Figure 10:
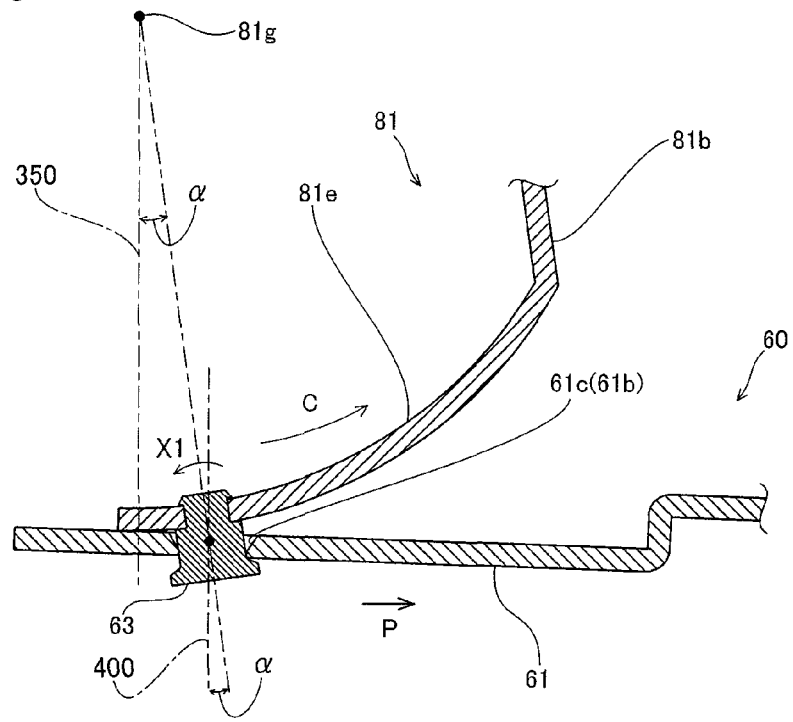
FIG. 10 illustrates an engaging state between the display screen support member and the rack plate when the display screen support member according to the embodiment of the present invention shown in FIG. 1 rotates in an anteroposterior (vertical) direction.
Figure 11:
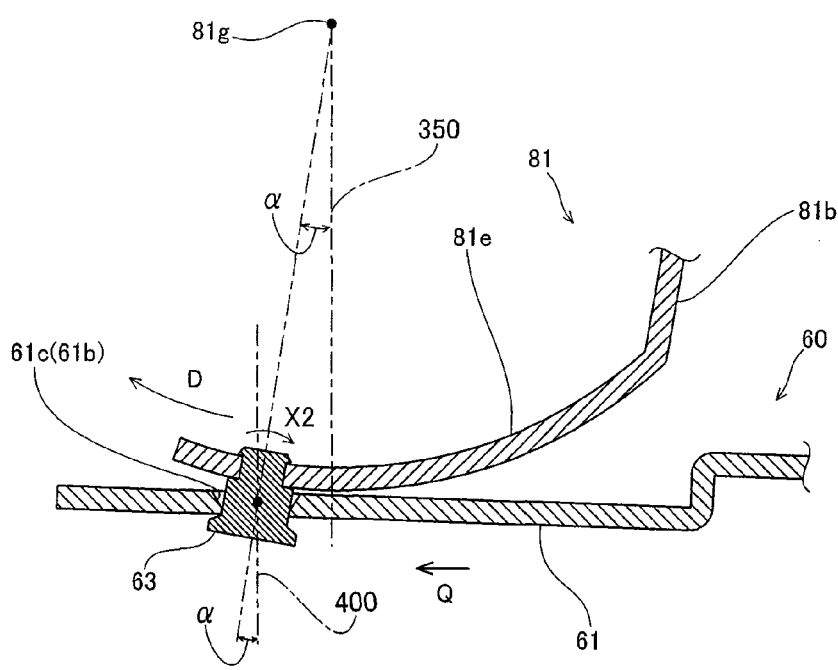
FIG. 11 illustrates a coupling state between the display screen support member and the rack plate when the display screen support member according to the embodiment of the present invention shown in FIG. 1 rotates in the anteroposterior (vertical) direction.

According to this embodiment, the rack plate 60 is constituted by a plate member 61 made of sheet metal and a rack gear 62 of made of resin, as shown in FIG. 5. The rack plate 60 is rotatably coupled to the display screen support member 81 of the display screen support mechanism 80 (see FIG. 5) in the horizontal plane with a coupling member 63 as shown in FIGS. 5, 10 and 11. The coupling member 63 is an example of the "coupling portion" in the present invention. The rack plate 60 is constituted such that the rack gear 62 is mounted on a lower surface side of the plate member 61 with a screw 90 as shown in FIG. 5 and is so arranged on the turning plate 31 of the base portion 30 as to mesh with an after-mentioned minor-diametral gear portion 55b of the gear 55 in the horizontal direction as shown in FIG. 3. As shown in FIGS. 5 and 8, the plate member 61 is provided with a long hole 61a extending along a longitudinal direction of the plate member 61 in the vicinity of a first end in the longitudinal direction of the plate member 61 and provided with a hole 61b in the vicinity of a second end in the longitudinal direction of the plate member 61. The long hole 61a and the hole 61b are examples of the "support hole" and the "second hole" in the present invention respectively. As shown in FIGS. 3 and 4, the rack plate 60 is so formed as to be reciprocable (slidable) along arrows P and Q when the rack plate 60 is inserted around the boss member 35 provided in the base member 34 through the long hole 61a of the plate member 61. Therefore, the rack plate 60 is so formed as to be reciprocable along arrows P and Q on the turning plate 31 by transmitting the normal and reverse rotation of the stepping motor 52 to the rack gear 62 through the transmission gear portion 51.

Figure 9:
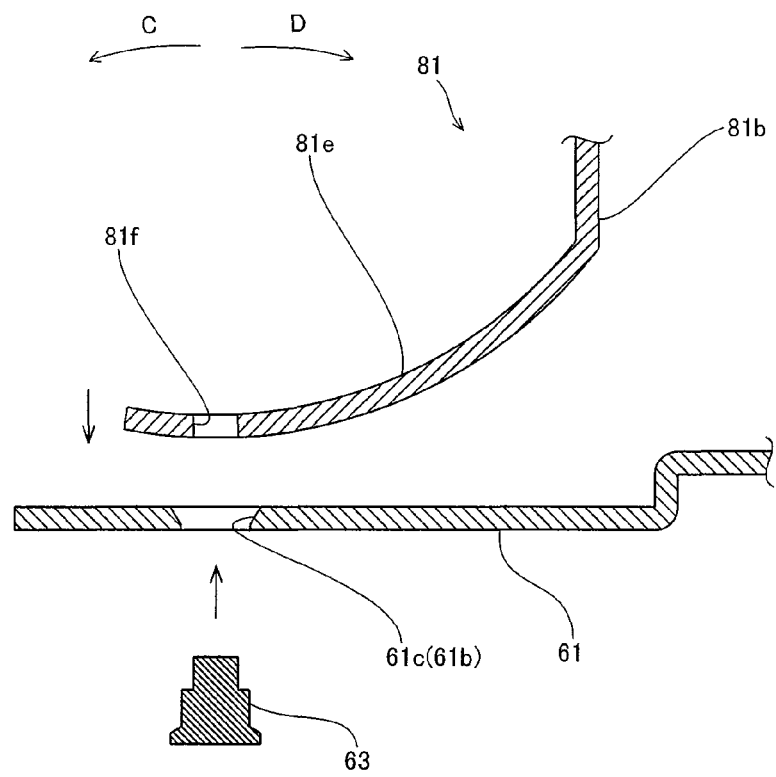
FIG. 9 is a diagram showing a part of enlarged the plate member of the rack plate and a display screen support member according to the embodiment of the present invention shown in FIG. 1.

According to this embodiment, the hole 61b of the plate member 61 is formed such that an inner side surface 61c has a tapered shape and a hole size increases toward a direction in which the coupling member 63 is inserted (upward direction), as shown in FIG. 9. Therefore, the rack plate 60 moves along arrows P and Q in the horizontal plane in a state where the plate member 61 and the after-mentioned display screen support member 81 are coupled to each other with the coupling member 63, so that the coupling member 63 can rotate along arrow X1 (see FIG. 10) and arrow X2 (see FIG. 11) with respect to a vertical plane 400 in the hole 61b of the plate member 61 when the display screen support member 81 rotates along arrow C (see FIG. 10) and arrow D (see FIG. 11) with respect to a vertical plane 350 about a rotation center (base portion) 81g, as shown in FIGS. 10 and 11. Thus, the display screen support member 81 can easily rotate in the anteroposterior direction (along arrows C and D) with respect to the vertical plane 350.

The plate member 61 of the rack plate 60 includes a positioning hole 61d and an engaging portion 61e, a screw mounting hole 61f for fixing the rack gear 62 at a position where the rack gear 62 is mounted from the lower surface side, as shown in FIGS. 5 and 8.

Figure 12:
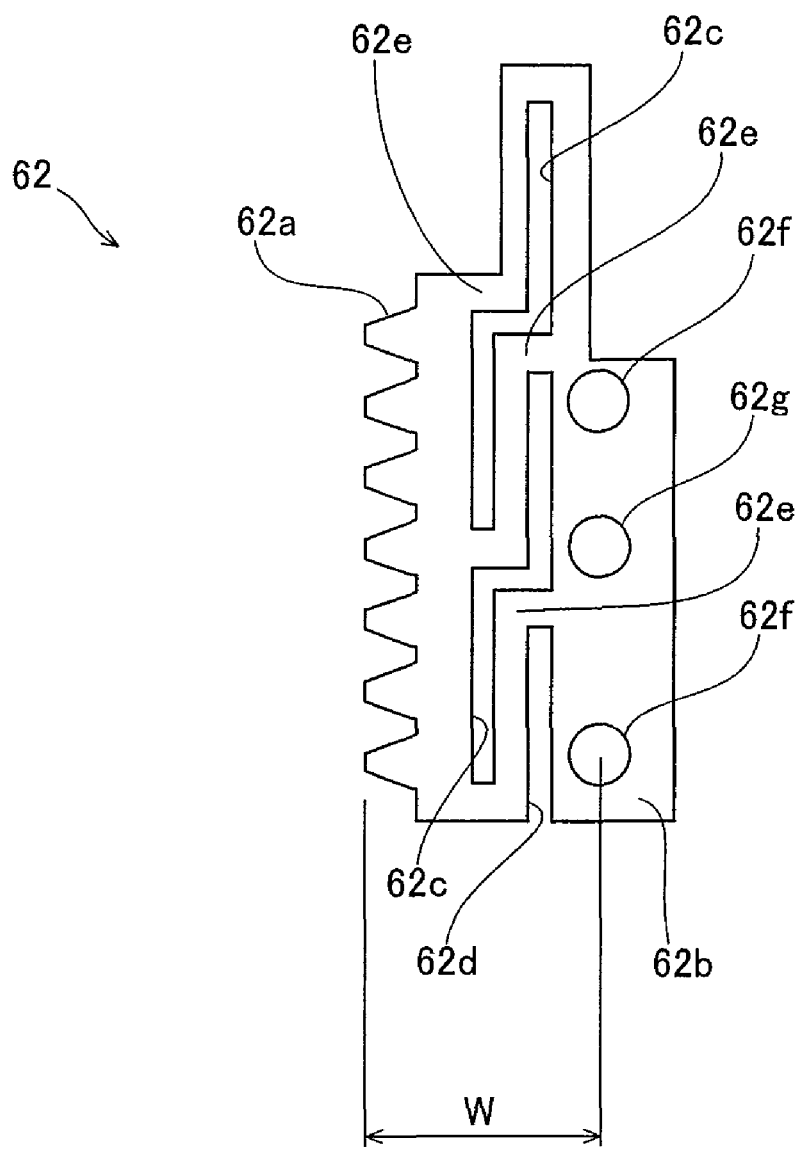
FIG. 12 is a diagram showing the rack gear of the rack plate according to the embodiment of the present invention shown in FIG. 1.

According to this embodiment, the rack gear 62 has a gear portion 62a formed along a longitudinal first side surface portion, a fixing portion 62b for mounting the rack gear 62 on the plate member 61, two notches 62c and one notch 62d and the gear portion 62a and the fixing portion 62b are integrally formed with each other with spring portions 62e elastically deformably connecting them, as shown in FIGS. 5 and 12. Each spring portion 62e is an example of the "connecting portion" in the present invention. As shown in FIG. 3, the spring portions 62e each have a function of deforming so as to reduce a distance W (see FIG. 12) between the gear portion 62a and the fixing portion 62b at a time of movement (swing) of the rack plate 60 along arrows P and Q and along arrows U1 and U2 intersecting with arrows P and Q when the gear portion 62a and the gear 55 (gear portion 55b) of the transmission gear portion 51 mesh with each other. Thus, the rack gear 62 is constituted such that the gear portions (the gear portion 62a and a major-diametral gear portion 55a of the gear 55) can smoothly mesh with each other without excessive external force.

As shown in FIGS. 5 and 12, the rack gear 62 is provided with two upward convex bosses 62f in the vicinity of both ends of the fixing portion 62b and one screw receiving hole 62g passing through the fixing portion 62b. Therefore, the bosses 62f of the rack gear 62 is fitted into the positioning hole 61d and the engaging portion 61e of the plate member 61, and the screw 90 is screwed into the screw mounting hole 61f of the plate member 61 through the screw receiving hole 62g of the rack gear 62 so that the rack gear 62 can be mounted on the plate member 61 from below, as shown in FIG. 5.

Figure 6:
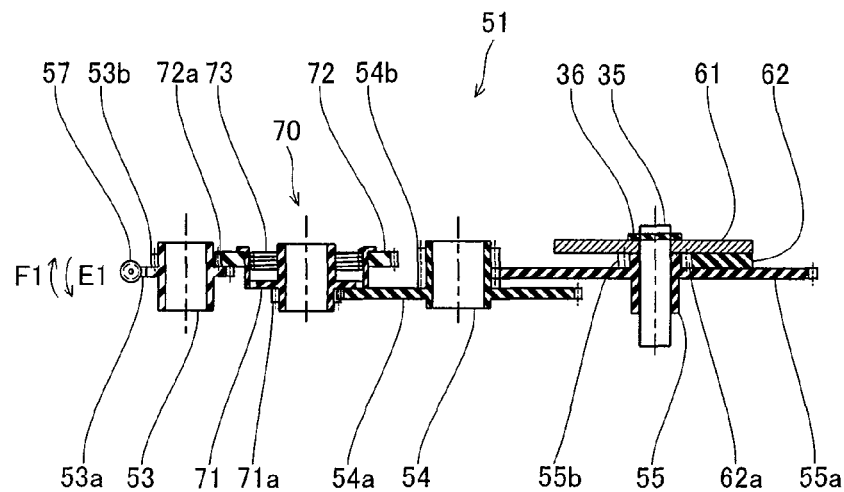
FIG. 6 is a diagram for illustrating an arrangement of a transmission gear portion of a vertical turn driving portion in the display screen turning apparatus according to the embodiment of the present invention shown in FIG. 1.

According to this embodiment, as shown in FIG. 3, the transmission gear portion 51 is constituted such that a gear 53 made of resin, a torque limiter 70, a gear 54 made of resin and the gear 55 made of resin are arranged in a gear box 56 made of resin. The torque limiter 70 is constituted by the driven gear 71 made of resin, the drive gear 72 made of resin, and a spring member 73 (coil spring) made of metal, as shown in FIGS. 3 and 6. The torque limiter 70 is constituted such that the rack plate 60 can be reciprocated along arrows P and Q through the transmission gear portion 51 and the rack gear 62 with the driving force of the stepping motor 52 when the driving force of the stepping motor 52 is less than prescribed driving torque, while the driving force of the stepping motor 52 is not transmitted to a reciprocating operation of the rack plate 60 when the driving force of the stepping motor 52 is prescribed driving torque or more, as shown in FIG. 3.

As shown in FIGS. 3 and 6, the gear 53 made of resin integrally includes a major-diametral gear portion 53a and a minor-diametral gear portion 53b. The gear 54 made of resin integrally includes a major-diametral gear portion 54a and a minor-diametral gear portion 54b. The gear 55 made of resin integrally includes the major-diametral gear portion 55a and the minor-diametral gear portion 55b.

According to this embodiment, a worm gear 57 made of resin is press-fitted into the rotational axis of the stepping motor 52 as shown in FIGS. 3 and 5. As shown in FIGS. 3 and 6, the worm gear 57 is meshed with the major-diametral gear portion 53a of the gear 53 perpendicular to the rotational axis. Therefore, driving force resulting from the stepping motor 52 is transmitted to the gear 53 through the worm gear 57, while the worm gear 57 and the stepping motor 52 can not be rotated with driving force resulting from the gear 53 and the gears following the gear 53. In other words, only the driving force resulting from the stepping motor 52 is transmitted to the transmission gear portion 51 with the worm gear 57.

As shown in FIGS. 5 and 6, the minor-diametral gear portion 53b of the gear 53 is meshed with a gear portion 72a of the drive gear 72 of the torque limiter 70 parallel to the rotational axis. As shown in FIGS. 5 and 6, a gear portion 71a of the driven gear 71 of the torque limiter 70 is meshed with the major-diametral gear portion 54a of the gear 54 parallel to the rotational axis and the minor-diametral gear portion 54b of the gear 55 is meshed with the major-diametral gear portion 54a of the gear 55 parallel to the rotational axis. As shown in FIGS. 5 and 6, the minor-diametral gear portion 55b of the gear 55 is meshed with the gear portion 62a of the rack gear 62 horizontal to the rotational axis. Therefore, the driving force of the stepping motor 52 is transmitted to the rack plate 60 through the worm gear 57, the gear 53, the torque limiter 70, the gear 54, the gear 55 and the rack gear 62 from arrangement of the aforementioned gear members shown in FIGS. 5 and 6. Referring to FIGS. 5 and 6, the gear box 56 (see FIG. 3) for arranging the transmission gear portion 51 and the stepping motor 52 therein is not shown in the drawing in order to describe the arrangement of the transmission gear portion 51.

Figure 13:
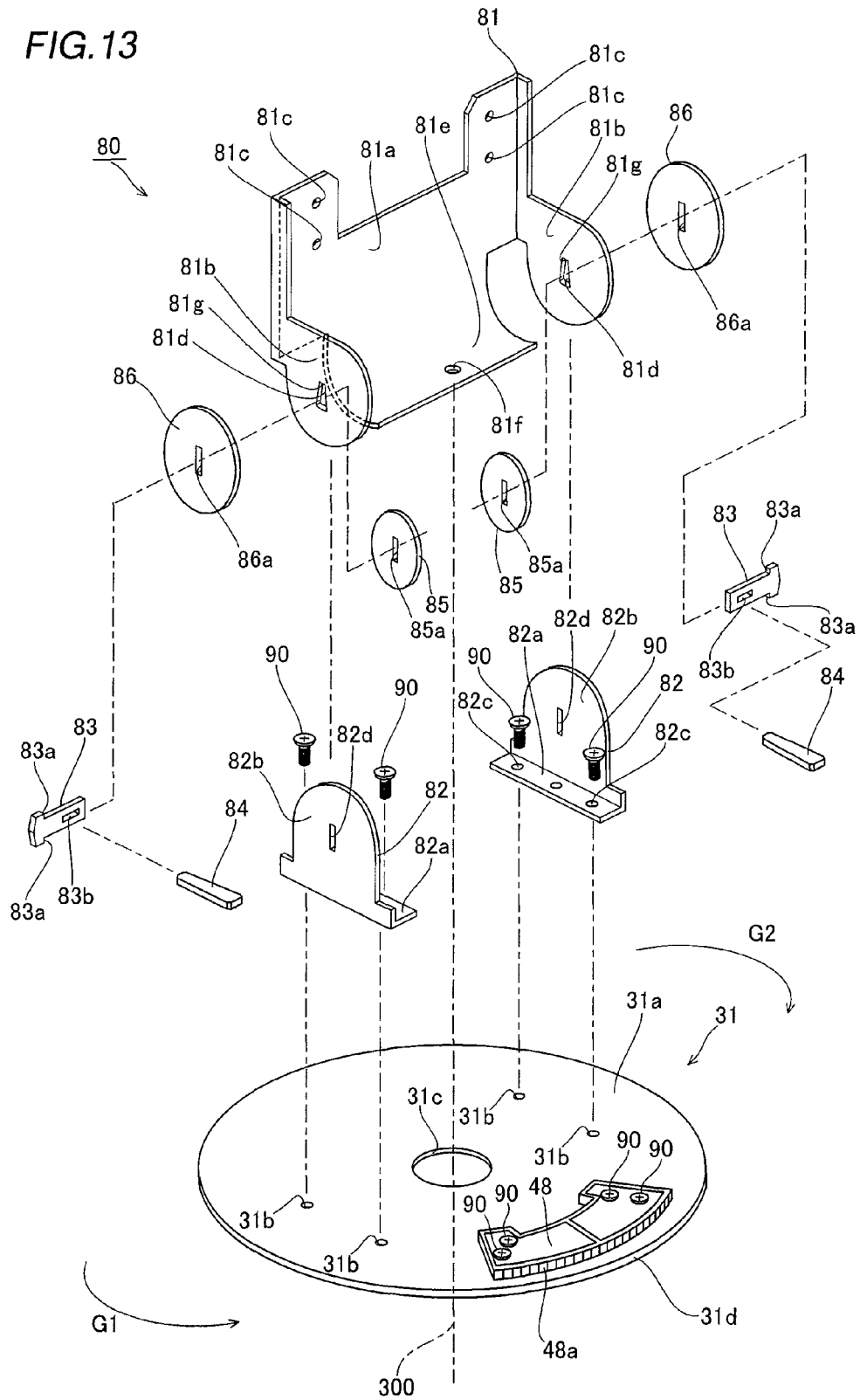
FIG. 13 is an exploded perspective view showing a structure of a display screen support mechanism and a turning plate according to the embodiment of the present invention shown in FIG. 1.

As shown in FIGS. 5 and 13, the turning plate 31 of the base portion 30 includes four screws receiving holes 31b provided on an upper surface 31a and a hole 31c provided on the center of the upper surface 31a (in the vicinity of the rotation center point of the turning plate 31). As shown in FIG. 3, the turning plate 31 is arranged substantially on the center of the base member 34, and a plurality of support members (not shown) so provided on the base member 34 as to circularly surround the turning plate 31 are rotatably held by coming into surface contact with an outer peripheral surface 31d (see FIG. 5) of the turning plate 31 and the outer peripheral surface 33a (see FIG. 5) of the guide member 33 (see FIG. 5).

The display screen support mechanism 80 is fixed to the screw receiving holes 31b of the turning plate 31 of the base portion 30 with the four screws 90 as shown in FIG. 2, for rendering the display body 10 rotatable in the anteroposterior direction (along arrows C and D) with respect to the vertical plane of the display screen turning apparatus 20 while supporting the display body 10 in a state inclined by the prescribed angle in the anteroposterior direction (along arrows C and D) with respect to the vertical plane of the display screen turning apparatus 20, as shown in FIG. 1.

The display screen support mechanism 80 is constituted by a display screen support member 81 made of sheet metal, a pair of vertical support members 82, platelike support shafts 83 made of sheet metal, stop members 84 of sheet metal, and pressure-contact plates 85 and 86 of sheet metal, as shown in FIGS. 5 and 6. The pressure-contact plates 85 and 86 are provided with rectangular holes 85a and 86a for receiving the support shafts 83 respectively. As shown in FIG. 2, the display screen support member 81 is mounted on the pair of vertical support members 82 so as to be rotatable at prescribed torque or more.

Figure 15:
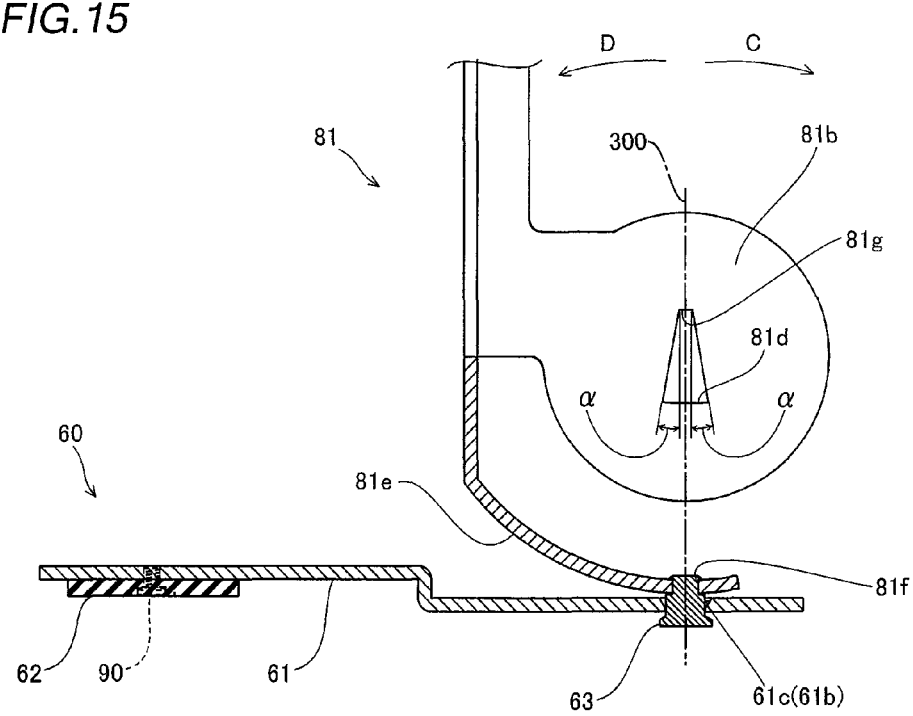
FIG. 15 illustrates a coupling state between the display screen support member of the display screen support mechanism and the rack plate according to the embodiment of the present invention shown in FIG. 2.

The display screen support member 81 made of sheet metal integrally includes a display body mounting portion 81a and a pair of rotating portions 81b as shown in FIG. 2. The display body mounting portion 81a of the display screen support member 81 is provided with four screws receiving holes 81c. The pair of rotating portions 81b of the display screen support member 81 are so provided as to extend from both side ends of the display body mounting portion 81a in a vertical direction with respect to a surface of the display body mounting portion 81a respectively. As shown in FIGS. 13 and 15, sectorial holes 81d are provided in the vicinity of the rotation centers of the pair of rotating portions 81b respectively. As shown in FIGS. 13 and 15, the display screen support member 81 is integrally formed with an arm portion 81e extending downward from the display body mounting portion 81a along outer periphery of the rotating portions 81b.

According to this embodiment, a receiving hole 81f for mounting the coupling member 63 inserted into the hole 61b of the rack plate 60 substantially on the center of the arm portion 81e, located at the lowest part of the arm portion 81e of the display screen support member 81 is provided, as shown in FIGS. 13 and 15. The receiving hole 81f is an example of the "first hole" in the present invention. As shown in FIGS. 13 and 15, the coupling member 63 is so mounted into the receiving hole 81f by calking as to be arranged on a vertical segment 300 (shown by a one-dot chain line) passing the rotation center (showing the rotation center of the turning plate 31) in the horizontal direction (along arrows G1 and G2 in FIG. 13) in the horizontal plane of the display screen support member 81.

Figure 14:
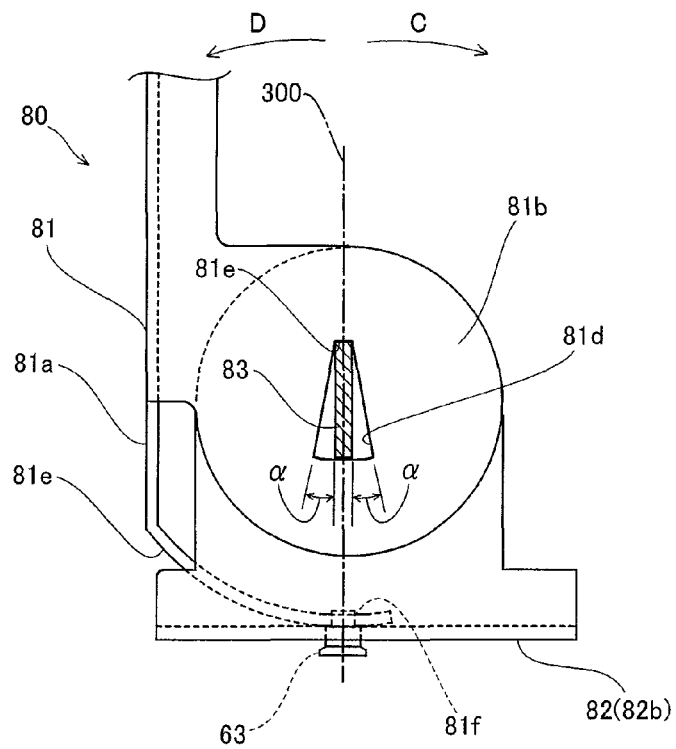
FIG. 14 is a sectional view taken along the line 200-200 in FIG. 2.

As shown in FIGS. 13 and 14, the sectorial holes 81d are provided for receiving the platelike support shafts 83. Further, the sectorial holes 81d are so arranged as to locate base portions 81g closer to the circle centers upward as shown in FIG. 15, so that the base portions 81g closer to the circle centers come into contact with the upper surfaces of the support shafts 83. Thus, the base portions 81g of the sectorial holes 81d receive the vertical load of the display body 10 through the display screen support member 81. Further, the sectorial holes 81d have central angles α (α=about 10° in this embodiment) opening toward the anteroposterior direction (along arrows C and D) from the vertical direction, as shown in FIGS. 14 and 15. The display screen support member 81 is rotatable along arrows C and D about the base portions 81g of the sectorial holes 81d supported by the platelike support shafts 83 in a sectorial angular range (α x2=2 in this embodiment) with respect to the support shafts 83. In other words, the platelike support shafts 83 function as the rotation axes of the display screen support member 81.

Figure 16:
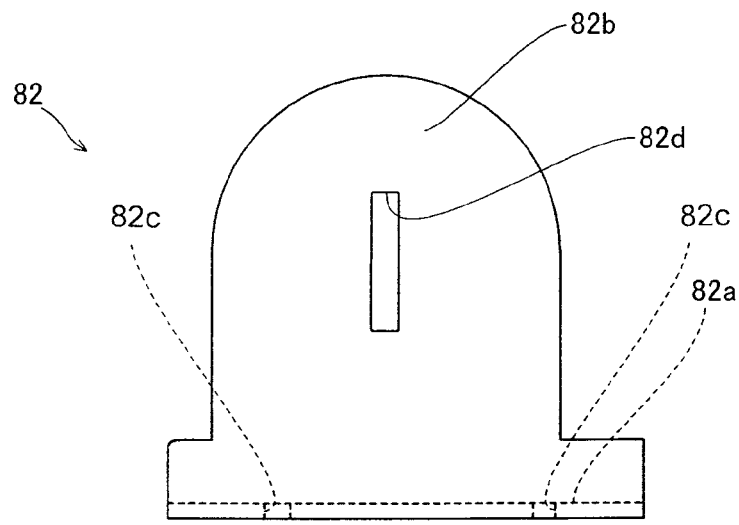
FIG. 16 is a front elevational view of a vertical support member of the display screen support mechanism according to the embodiment of the present invention shown in FIG. 2.

The pair of vertical support members 82 include turning plate mounting portions 82a and rotating portion mounting portions 82b respectively, as shown in FIGS. 13 and 16. The turning plate mounting portions 82a of the vertical support members 82 are provided with four screws receiving holes 82c (see FIG. 3). The rotating portion mounting portions 82b of the vertical support members 82 are so provided as to extend upward in the vertical direction with respect to the surfaces of the turning plate mounting portions 82a from first ends of the turning plate mounting portion 82a.

As shown in FIG. 16, holes 82d are provided in the rotating portion mounting portions 82b of the vertical support members 82. The holes 82d are provided for receiving the platelike support shafts 83, as shown in FIG. 13. Thus, the holes 82d receive the vertical load of the display body 10 through the display screen support member 81 and the support shafts 83. In other words, the base portions 81g of the sectorial holes 81d of the display screen support member 81 and the holes 82d of the vertical support members 82 receive the vertical load of the display body 10, according to this embodiment. The display screen support member 81 is rotatable about the base portions 81g of the sectorial holes 81d in the sectorial angular range (α x=about 20° in this embodiment) with respect to the vertical support members 82.

The platelike support shafts 83 made of sheet metal include pairs of contact portions 83a and rectangular holes 83b respectively, as shown in FIG. 13. The pairs of contact portions 83a of the support shafts 83 are so provided as to protrude from rear ends of both side surfaces of the support shafts 83 extending in the longitudinal direction. These contact portions 83a are provided for coming into contact with the pressure-contact plates 86 closer to the display screen support member 81, as shown in FIGS. 2 and 13. The rectangular holes 83b of the support shafts 83 are provided for receiving the stop members 84 as shown in FIGS. 2 and 13.

Figure 17:
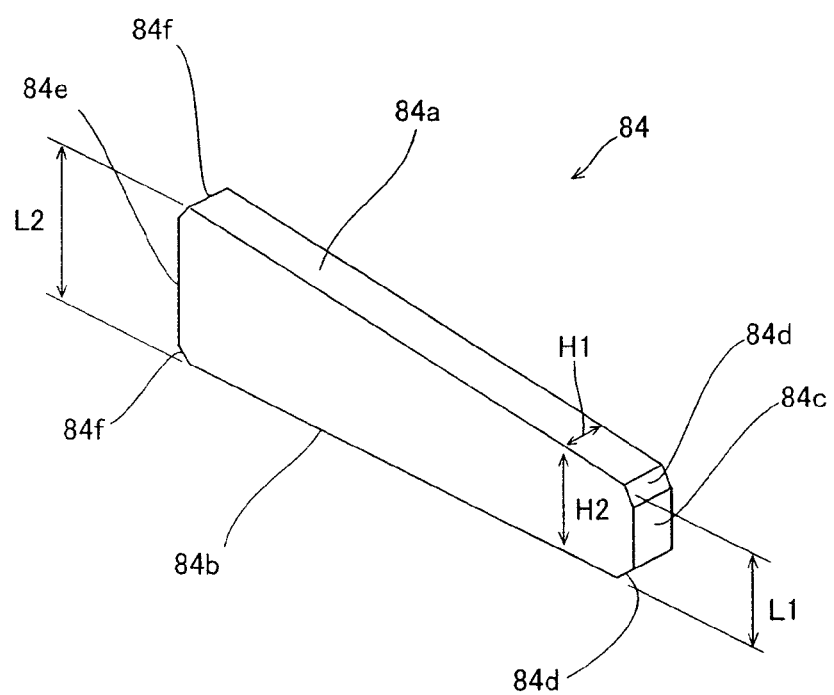
FIG. 17 is a diagram showing a stop member of the display screen support mechanism according to the embodiment of the present invention shown in FIG. 1.

As shown in FIG. 17, each stop member 84 made of sheet metal has a tapered shape formed by an end surface portion 84a and an end surface portion 84b, and includes chamfer 84d provided on a first side surface 84c extending in a longitudinal direction and a chamfer 84f provided on a second side surface 84e extending in the longitudinal direction. As shown in FIG. 17, the length L1 of the first side surface 84c of each stop member 84 is smaller than the length L2 of each second side surface 84e, and distance between each end surface portion 84a and each end surface portion 84b (length in a direction H2 perpendicular to a thickness direction H1 of each stop member 84) is linearly changed from L1 to L2. Thus, the stop members 84 formed in the (tapered) wedged manner can be easily inhibited from slipping off when inserted into the rectangular holes 83b (see FIG. 13) provided in the platelike support shafts 83, as shown in FIG. 2. The chamfers 84b are provided such that the stop members 84 can be easily inserted into the rectangular holes 83b (see FIG. 13) provided in the support shafts 83.

As shown in FIGS. 3 and 5, the horizontal turn driving portion 40 is constituted by a transmission gear portion 41 for rotating the turning plate 31 on the base portion 30 in the horizontal direction (along arrows A and B in FIG. 1) in the horizontal plane and a stepping motor 42 serving as a driving source of the transmission gear portion 41. The horizontal turn driving portion 40 is so formed as to be arranged in the base portion 30 as shown in FIGS. 3 and 4. As shown in FIG. 3, the transmission gear portion 41 is constituted such that a gear 43 made of resin, a torque limiter 75, a gear 44 made of resin and the gear 45 made of resin are arranged in a gear box 46 made of resin.

Figure 7:
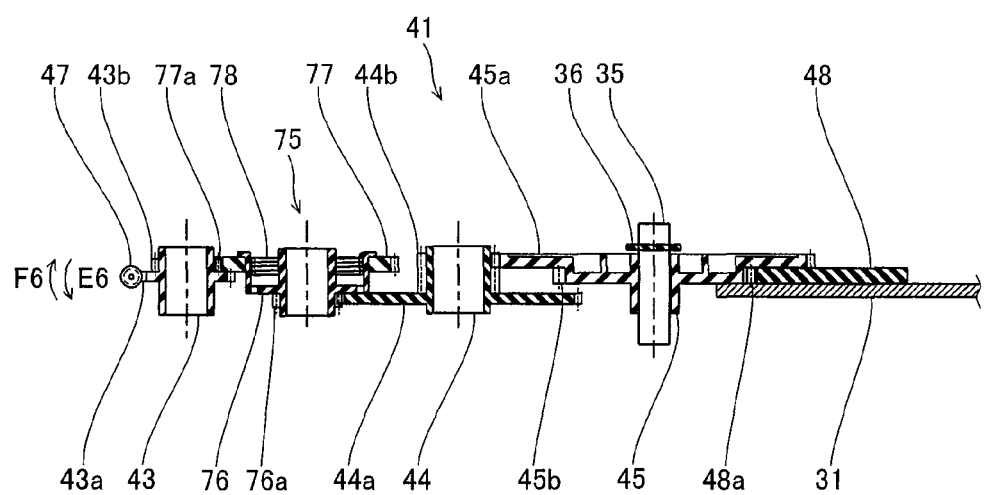
FIG. 7 is a diagram for illustrating an arrangement of a transmission gear portion of a horizontal turn driving portion in the display screen turning apparatus according to the embodiment of the present invention shown in FIG. 1.

As shown in FIG. 5, a worm gear 47 made of resin is press-fitted into the rotational axis of the stepping motor 42. As shown in FIGS. 5 and 7, the gear 43 integrally includes a major-diametral gear portion 43a and a minor-diametral gear portion 43b. The gear 44 integrally includes a major-diametral gear portion 44a and a minor-diametral gear portion 44b. The gear 45 integrally includes a major-diametral gear portion 45a and a minor-diametral gear portion 45b. As shown in FIGS. 3 and 5, a turning gear member 48 made of resin is fixed on the upper surface 31a of the turning plate 31 of the base portion 30 with four screws 90. Referring to FIGS. 5 and 7, the gear box 46 (see FIG. 3) for arranging the transmission gear portion 41 and the stepping motor 42 therein is not shown in the drawing in order to describe the arrangement of the transmission gear portion 41.

As shown in FIGS. 5 and 7, the worm gear 47 is meshed with the major-diametral gear portion 43a of the gear 43 perpendicular to the rotational axis and the minor-diametral gear portion 43b of the gear 43 is meshed with a gear portion 77a of a drive gear 77 of the torque limiter 75 parallel to the rotational axis. As shown in FIGS. 5 and 7, a gear portion 76a of a driven gear 76 of the torque limiter 75 is meshed with the major-diametral gear portion 44a of the gear 44 parallel to the rotational axis and the minor-diametral gear portion 44b of the gear 44 is meshed with the major-diametral gear portion 45a of the gear 45 parallel to the rotational axis. As shown in FIGS. 5 and 7, the minor-diametral gear portion 45b of the gear 45 is meshed with a turning gear portion 48a of the turning gear member 48 parallel to the rotational axis. Therefore, the driving force of the stepping motor 42 is transmitted to the turning plate 31 through the worm gear 47, the gear 43, the torque limiter 75, the gear 44, the gear 45 and the turning gear member 48 from arrangement of the aforementioned gear members shown in FIGS. 5 and 7.

The torque limiter 75 is constituted by a driven gear 76 made of resin, a drive gear 77 made of resin and a spring member 78 (coil spring) made of metal, as shown in FIGS. 3 and 7. As shown in FIG. 3, the torque limiter 75 is constituted such that the driving force of the stepping motor 42 is transmitted to the turning portion 31 of the base portion 30 through the transmission gear portion 41 to turn the turning portion 31 inside the display screen turning apparatus 20 when the driving force of the stepping motor 42 is less than prescribed driving torque, while the driving force of the stepping motor 42 is not transmitted to the turning portion 31 of the base portion 30 when the driving force of the stepping motor 42 is prescribed driving torque or more.

As shown in FIGS. 1 and 2, the display body 10 is constituted by a front cabinet 11 made of resin and a rear cabinet 12 made of resin. A liquid crystal module 14 (see FIG. 4) mounted with a liquid crystal panel 13 (see FIG. 4) is so formed inside the display body 10 as to be surrounded by the front cabinet 11 and the rear cabinet 12. The display body 10 is mounted on the display screen support member 81 by fastening the screws 70 to screw mounting holes of the rear cabinet 12 (not shown) through the screw receiving holes 81a of the display screen support member 81. The rear cabinet 12 is integrally provided with a notch 12a for arranging the display screen support member 81 in a concealed manner. A plurality of screw receiving holes 12b (seven portions in this embodiment) are provide on an outer peripheral portion of the rear cabinet 12 so that the rear cabinet 12 is mounted on the front cabinet 11 through screws 91. As shown in FIG. 2, a rectangular recess portion 12d is formed in a side surface portion 12c of the rear cabinet 12 and is formed with a plurality of through-holes 12e. The plurality of through-holes 12e are provided for connecting cables from AV terminals (not shown) connected to control boards (not shown) for controlling the liquid crystal module 13 to an external apparatus of the display body 10.

In the display screen turning apparatus 20, a cover member 21 made of resin is mounted on the base member 34 with screws (not shown) inserted from a lower surface side of the base member 34 of the base portion 30, as shown in FIGS. 1 and 4. A cover member 22 made of resin is so mounted on the upper surface 31a of the turning plate 31 with screws (not shown) as to cover the base portion 30 from above and be turnable integrally with the turning plate 31 of the base portion 30 along arrow A (see FIG. 1) and arrow B (see FIG. 1) as shown in FIGS. 1 and 4. As shown in FIGS. 2 and 4, the cover member 22 made of resin is provided with a notch 22a for rotatably arranging the display screen support mechanism 80 (display screen support member 81) in the anteroposterior direction (along arrows C and D in FIG. 4).

Turning operations of the display screen turning apparatus 20 according to this embodiment in the anteroposterior direction and the horizontal direction will be now described with reference to FIGS. 1, 3, 4, 6, 7, 13, 14 and 18 to 28.

As shown in FIG. 4, when the display screen turning apparatus 20 rotates the display screen support mechanism 80 in the anteroposterior direction (along arrows C and D) with respect to the vertical plane, the liquid crystal panel 13 of the display body 10 rotates upward and downward. Therefore, the anteroposterior direction is referred to as a vertical direction in the following description of the operation.

The turning operation of the display screen turning apparatus 20 in the vertical direction (along arrows C and D in FIG. 1) will be now described.

As shown in FIGS. 3 and 4, a user presses an upward tilt button (not shown) of an attached remote control (not shown) in a state where the display screen support member 81 is perpendicular to the turning plate 31 on the base portion 30 and directed frontward (state where a central portion of the turning gear portion 48a of the turning gear member 48 is meshed with the minor-diametral gear portion 45b of the gear 45 in FIG. 3), whereby a signal turning the display body 10 (see FIG. 4) upward (along arrow C in FIG. 4) is transmitted to a control circuit portion (not shown) of the display body 10. The stepping motor 52 (see FIG. 3) of the display screen turning apparatus 20 (see FIG. 3) is driven on the basis of this signal. More specifically, the worm gear 57 mounted on the stepping motor 52 rotates along arrow E1 (see FIG. 6) following the drive of the stepping motor 52, and the drive gear 72 of the torque limiter 70 rotates along arrow E3 through the gear 53, as shown in FIG. 3. Similarly, the driven gear 71 of the torque limiter 70 rotates along arrow E3 and the gear 55 rotates along arrow E5 through the gear 54, as shown in FIG. 3

According to this embodiment, the plate member 61 of the rack plate 60 starts moving along arrow P along with the rack gear 62 horizontally meshed with the gear 55 following the rotation of the gear 55 along arrow E5, as shown in FIG. 3. Thus, the coupling member 63 of the display screen support member 81 engaged with the hole 61b of the plate member 61 starts rotating along arrow C as shown in FIG. 4, and hence the display body 10 mounted on the display screen support member 81 starts turning upward (along arrow C) along with the display screen support member 81.

Figure 19:
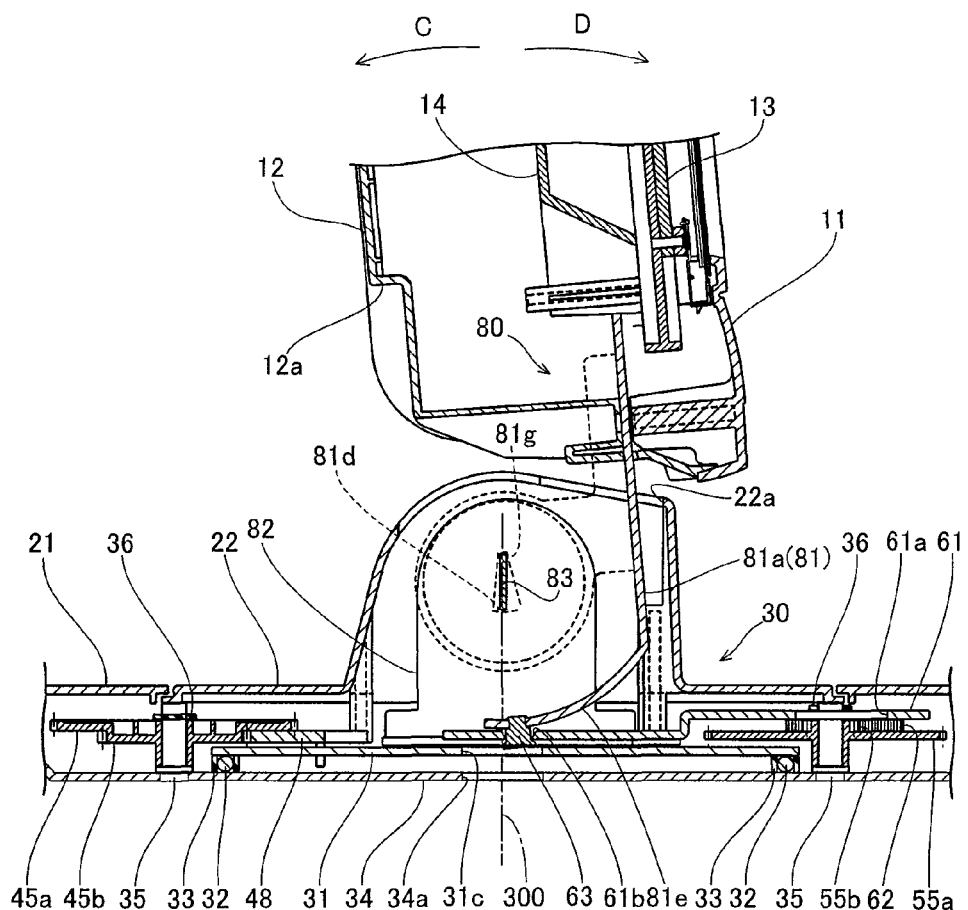

At this time, the display screen support member 81 rotates along arrow C about the base portions 81g while the base portions 81g of the sectoral holes 81d of the display screen support member 81 and the upper surfaces of the support shafts 83 come into contact with each other, as shown in FIG. 14. The display screen support member 81 mounted with the display body 10 continuously turns along arrow C at a prescribed turning speed following the drive of the stepping motor 52 (see FIG. 3) as shown in FIG. 19.

When the display body 10 is turned upward (along arrow C in FIG. 4) by an angle desired by the user, the user releases the press of the upward tilt button (not shown) of the attached remote control (not shown) so that the signal turning the display body 10 (see FIG. 4) upward (along arrow C in FIG. 4) is not transmitted to the control circuit portion (not shown) of the display body 10. Therefore, the drive of the stepping motor 52 is stopped. Thus, the display screen support member 81 stops turning along arrow C at a position shown in FIG. 19 and stands still.

Figure 20:
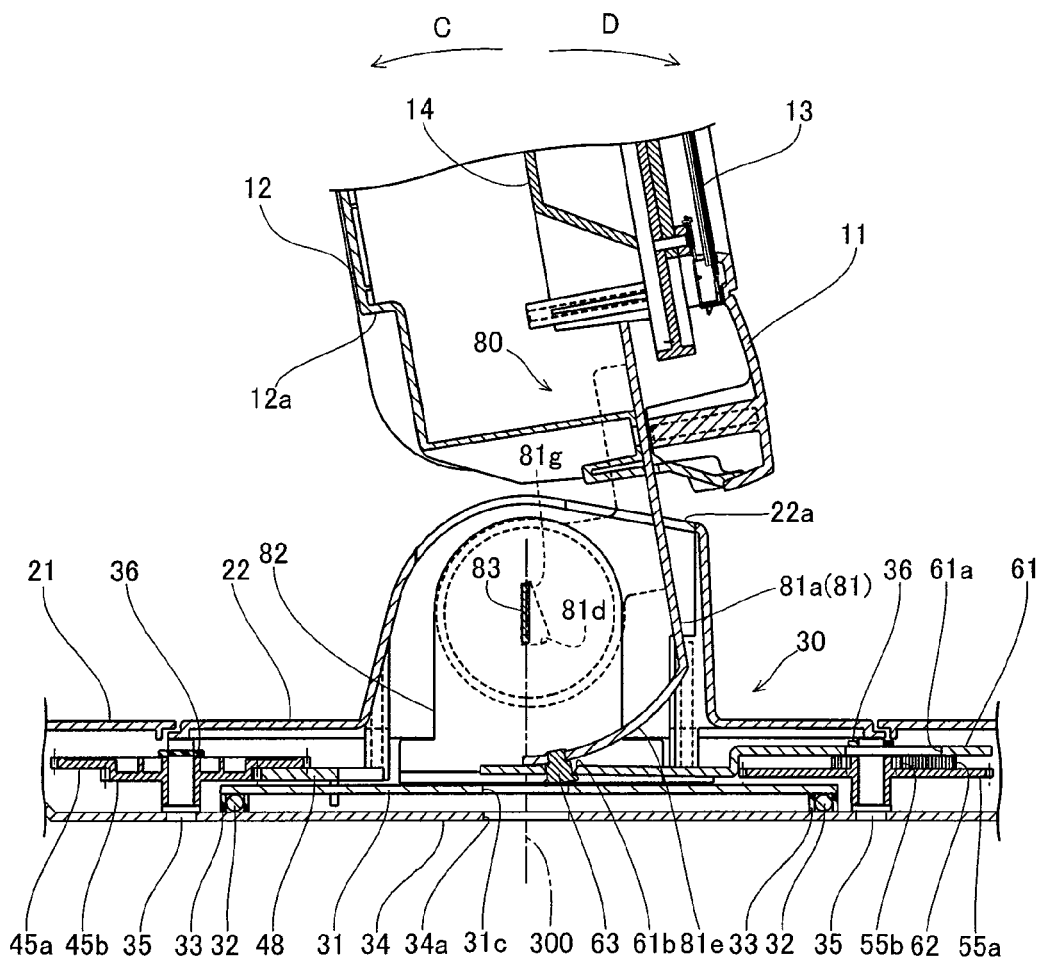

In a state where the display body 10 (see FIG. 19) is continuously turned upward (along arrow C in FIG. 19) by the user, first edges of the holes 81d of the display screen support member 81 come into contact with the support shafts 83 as shown in FIG. 20, whereby the display screen support member 81 reaches the prescribed turning angle (10° in this embodiment). Therefore, the display body 10 stops turning upward (along arrow C) at a position shown in FIG. 20 and stands still at this position. At this time, the stepping motor 52 (see FIG. 18) continuously drives and hence driving torque transmitted from the stepping motor 52 (see FIG. 18) is transmitted to the drive gear 72 (see FIG. 18) of the torque limiter 70 (see FIG. 18) through the worm gear 57 (see FIG. 18) and the gear 53 (see FIG. 18).

Figure 18:
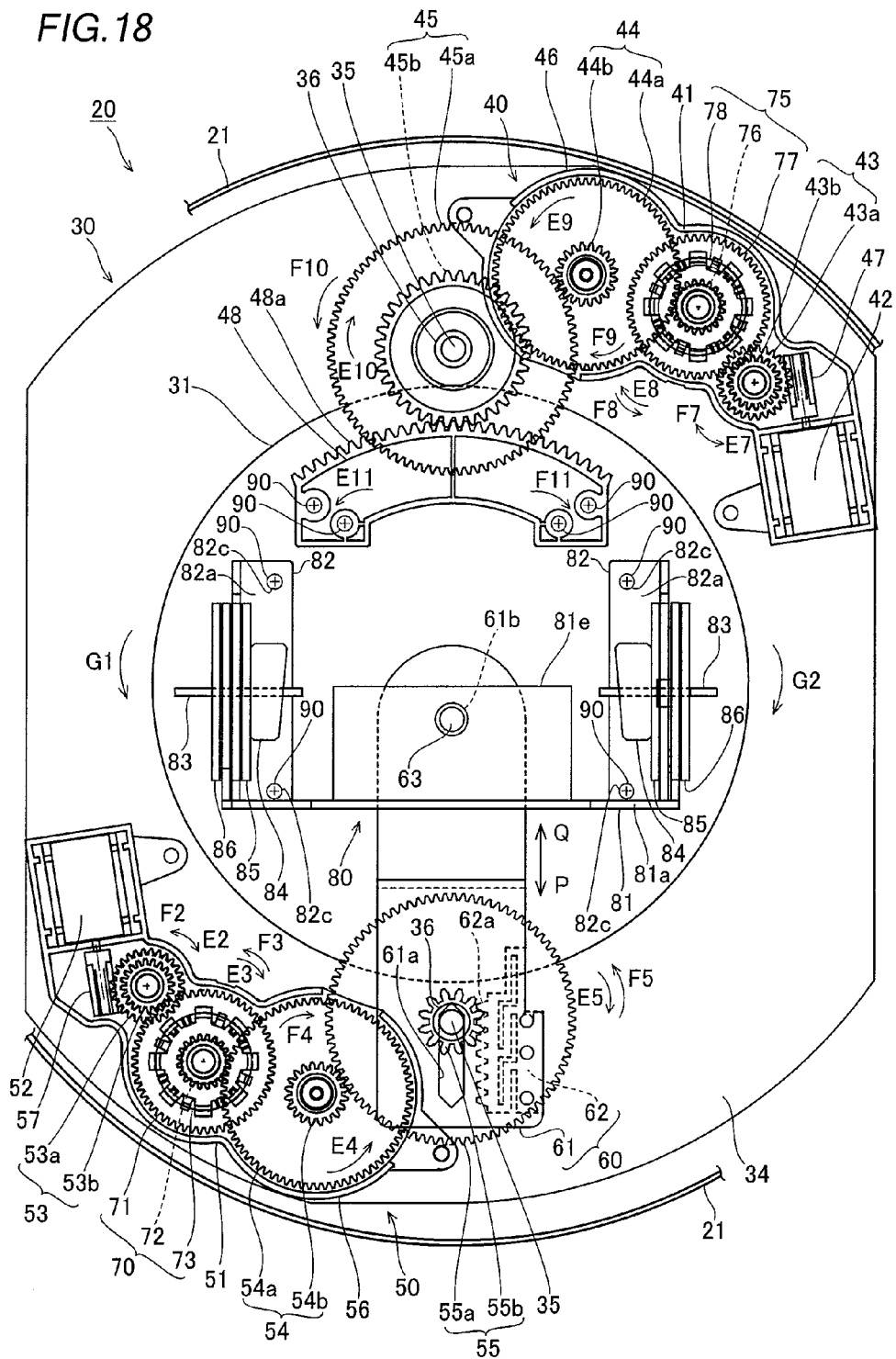
FIGS. 18 to 23 are diagrams for illustrating a turning operation of the display screen turning apparatus according to the embodiment of the present invention shown in FIG. 1 in the anteroposterior (vertical) direction.

As shown in FIG. 6, the drive gear 72 is pressed against the driven gear 71 with the urging force previously set by the spring member 73, and therefore the inner peripheral surface of the drive gear 72 and the outer peripheral surface of the driven gear 71 slip so that the driving torque of the drive gear 72 is not transmitted to the driven gear 71, when driving torque, which is not less than the frictional force between the inner peripheral surface of the drive gear 72 and the outer peripheral surface of the driven gear 71 following the pressure contact force of the spring member 73, occurs with respect to the drive gear 72. In other words, the driven gear 71, the gear 54 and the gear 55 stop rotation regardless of the rotation of the drive gear 72, when the rack plate 60 stops moving (sliding) along arrow P as shown in FIG. 18.

As shown in FIGS. 3 and 4, the user presses a downward tilt button (not shown) of the attached remote control (not shown) in the state where the display screen support member 81 is perpendicular to the turning plate 31 on the base portion 30 and directed frontward (state where the central portion of the turning gear portion 48a of the turning gear member 48 is meshed with the minor-diametral gear portion 45b of the gear 45 in FIG. 3), whereby a signal turning the display body 10 (see FIG. 4) downward (along arrow D in FIG. 4) is transmitted to the control circuit portion (not shown) of the display body 10 and the stepping motor 52 (see FIG. 3) of the display screen turning apparatus 20 (see FIG. 3) is driven. More specifically, the worm gear 57 mounted on the stepping motor 52 rotates along arrow F1 (see FIG. 6) following the drive of the stepping motor 52, and the drive gear 72 of the torque limiter 70 rotates along arrow F3 through the gear 53, as shown in FIG. 3. The driven gear 71 of the torque limiter 70 rotates along arrow F3 and the gear 55 rotates along arrow F5 through the gear 54 as shown in FIG. 3.

According to this embodiment, the plate member 61 of the rack plate 60 starts moving along arrow Q along with the rack gear 62 horizontally meshed with the gear 55 following rotation of the gear 55 along arrow F5, as shown in FIG. 3. Thus, the coupling member 63 engaged with the hole 61b of the rack plate 60 starts rotating along arrow D as shown in FIG. 4, and hence the display body 10 mounted on the display screen support member 81 starts turning downward (along arrow D) along with the display screen support member 81 at a prescribed rotational speed.

Figure 22:
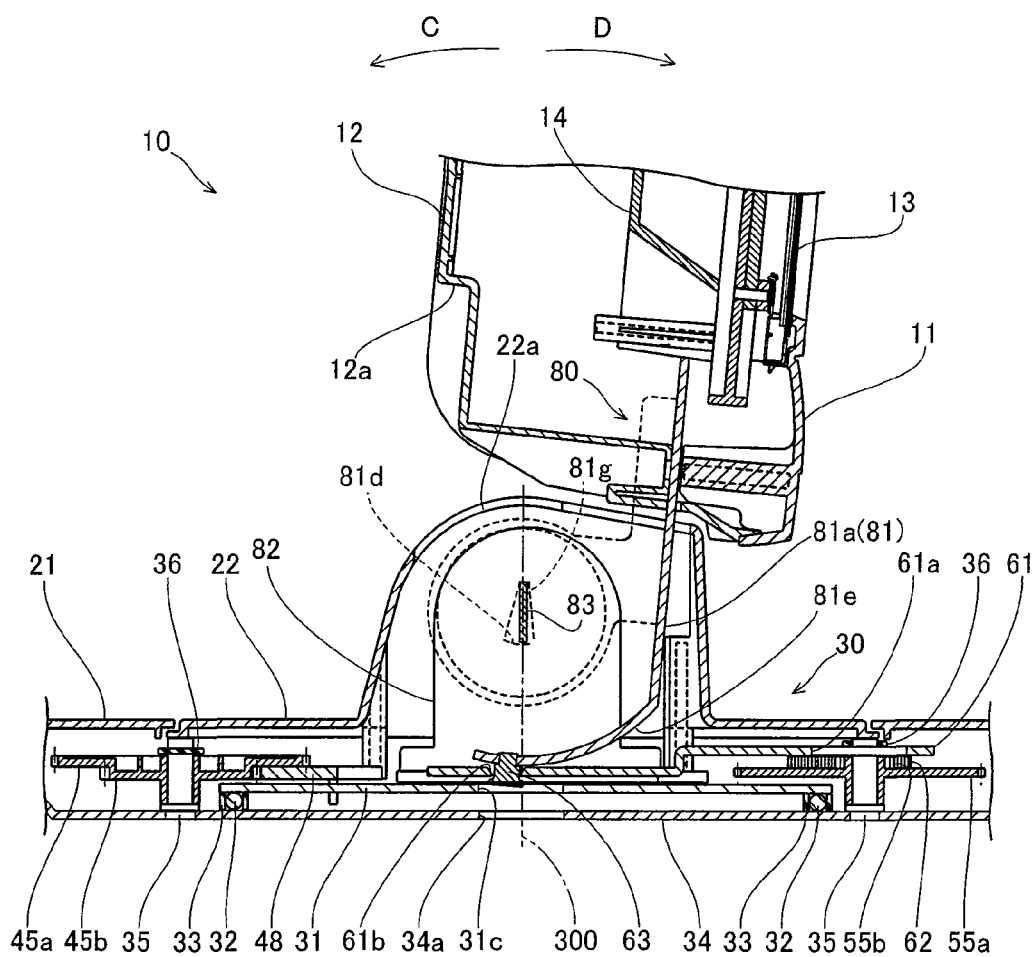

At this time, the display screen support member 81 stars rotating along arrow D about the base portions 81g while the base portions 81g of the sectoral holes 81d of the display screen support member 81 and the upper surfaces of the support shafts 83 come into contact with each other, as shown in FIG. 14. The display screen support member 81 mounted with the display body 10 continuously turns along arrow D at the prescribed turning speed following the drive of the stepping motor 52 (see FIG. 3) as shown in FIG. 22.

When the display body 10 is turned downward (along arrow D in FIG. 4) by an angle desired by the user, the user releases the press of the downward tilt button (not shown) of the attached remote control (not shown) so that the signal turning the display body 10 (see FIG. 4) upward (along arrow D in FIG. 4) is not transmitted to the control circuit portion (not shown) of the display body 10, and hence the drive of the stepping motor 52 is stopped. Thus, the display screen support member 81 stops turning along arrow D at a position shown in FIG. 22 and stands still.

Figure 23:
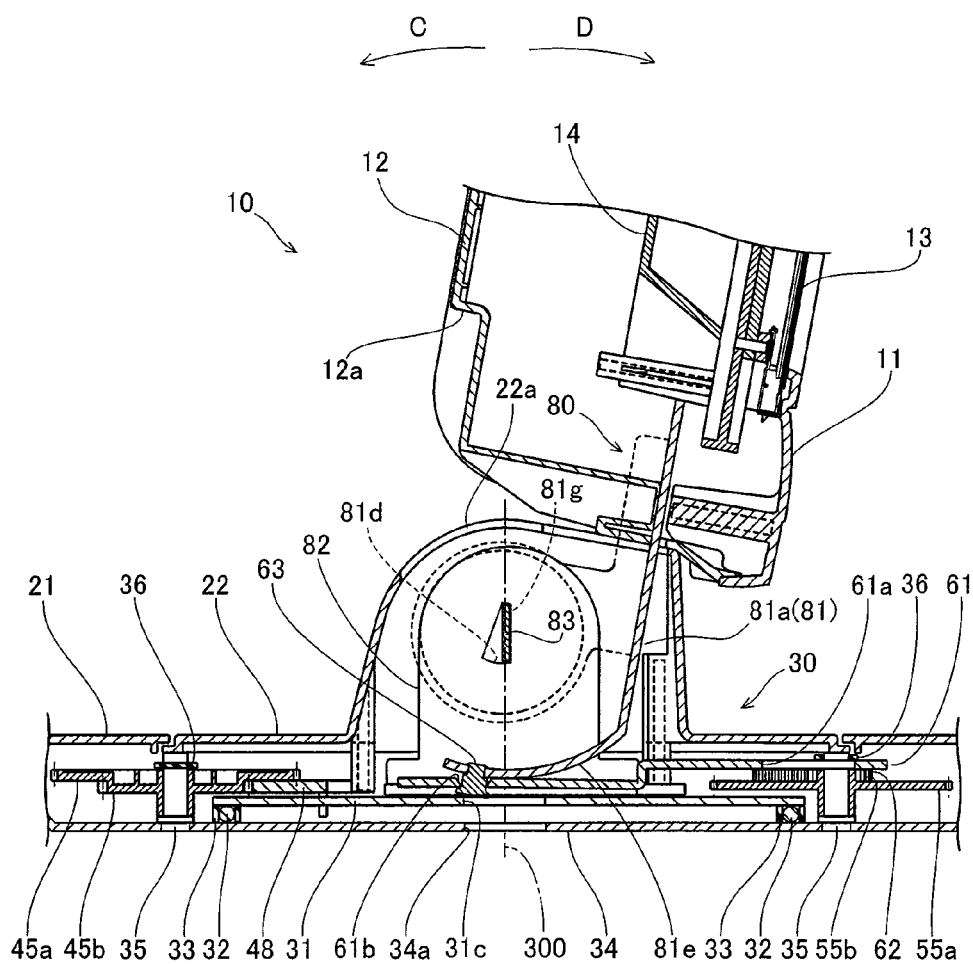

In a state where the display body 10 (see FIG. 22) is continuously rotated downward (along arrow D in FIG. 22) by the user, second edges of the holes 81d of the display screen support member 81 come into contact with the support shafts 83 as shown in FIG. 23, whereby the display screen support member 81 reaches the prescribed turning angle (10° in this embodiment). Therefore, the display body 10 stops rotating downward (along arrow D) at a position shown in FIG. 23 and stands still at this position. At this time, the stepping motor 52 (see FIG. 21) continuously drives and hence driving torque transmitted from the stepping motor 52 (see FIG. 21) is transmitted to the drive gear 72 (see FIG. 21) of the torque limiter 70 (see FIG. 21) through the worm gear 57 (see FIG. 21) and the gear 53 (see FIG. 21) similarly to the above.

Figure 21:
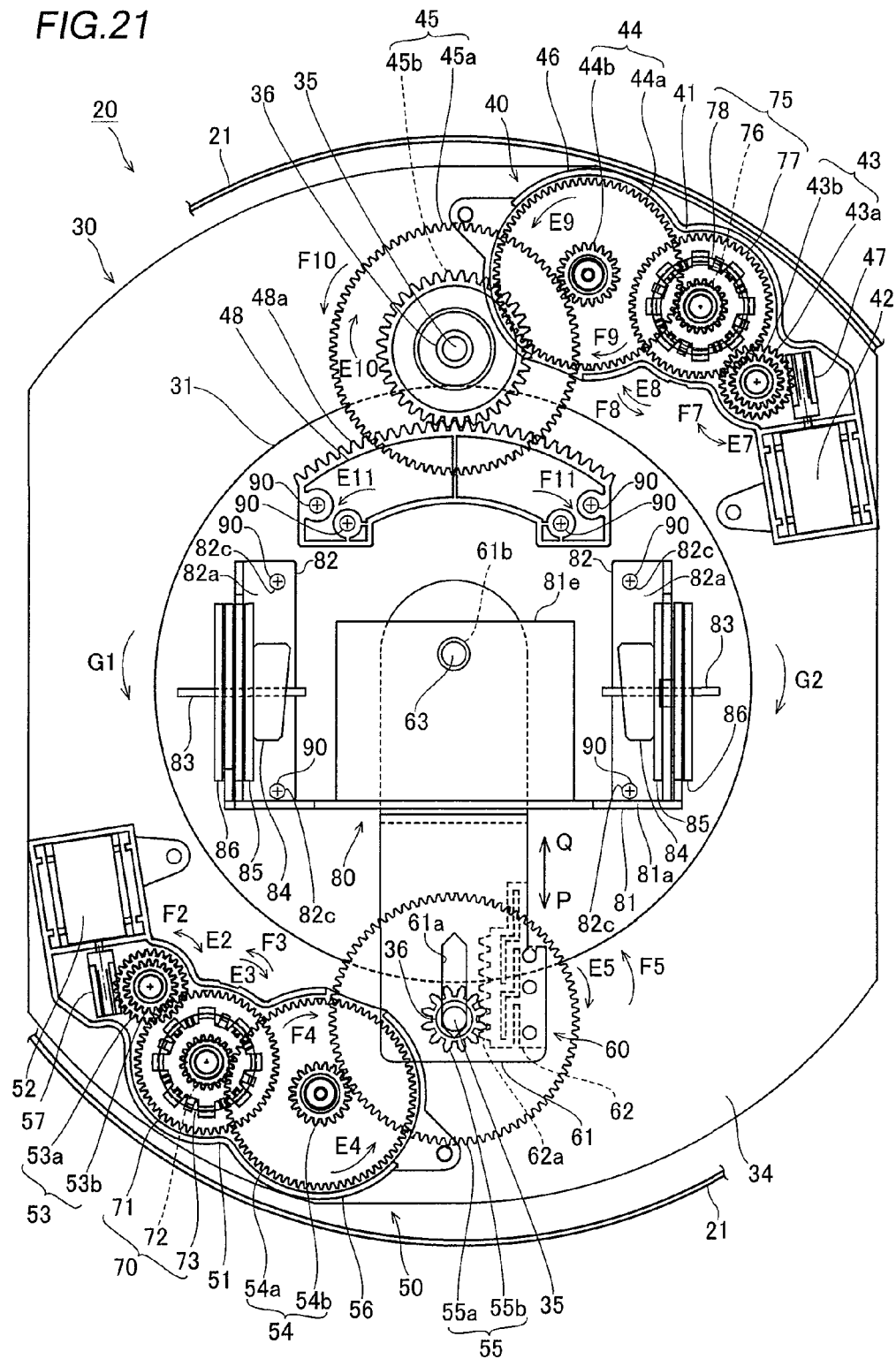

As shown in FIG. 6, the drive gear 72 is pressed against the driven gear 71 with the urging force previously set by the spring member 73, and therefore the inner peripheral surface of the drive gear 72 and the outer peripheral surface of the driven gear 71 slip so that the driving torque of the drive gear 72 is not transmitted to the driven gear 71, when driving torque, which is not less than the frictional force between the inner peripheral surface of the drive gear 72 and the outer peripheral surface of the driven gear 71 following the pressure contact force of the spring member 73, occurs with respect to the drive gear 72, similarly to the case where the display body 10 (see FIG. 19) stops turning upward (along arrow C in FIG. 19). In other words, the driven gear 71, the gear 54 and the gear 55 stop rotation regardless of the rotation of the drive gear 72, when the rack plate 60 stops moving (sliding) along arrow Q as shown in FIG. 21.

When the display body 10 (see FIG. 1) rotates in the vertical direction (±10° along arrows C and D in FIG. 1) as described above, the rack plate 60 is also slightly displaced (deformed) in a direction in which the hole 61b of the plate member 61 moves upward from a horizontal position (position of the rack plate 60 in FIG. 4) following the rotation of the display screen support member 81 and the coupling member 63, as shown in FIGS. 20 and 23. At this time, while the rack gear 62 fixed to the plate member 61 also gradually slightly moves up from the horizontal position, the gear portion 62a of the rack gear 62 is connected to the fixing portion 62b with the elastically deformable spring portions 62e, so that the gear portion 62a is kept in the state of meshing with the gear portion 55b of the gear 55 in the horizontal direction with no influence by displacement of the plate member 61. Therefore, the gear portion 62a of the rack gear 62 and the gear portion 55b of the gear 55 are always properly meshed with each other, and hence the driving force of the transmission gear portion 51 is smoothly transmitted to the rack plate 60.

The turning operation of the display screen turning apparatus 20 in the horizontal direction in the horizontal plane will be now described.

As shown in FIGS. 3 and 4, the user presses a horizontal turn button (not shown) of the attached remote control (not shown) in the state where the display screen support member 81 is perpendicular to the turning plate 31 on the base portion 30 and directed frontward, whereby a signal turning the display body 10 (see FIG. 1) rightward (along arrow A in FIG. 1) is transmitted to the control circuit portion (not shown) of the display body 10, and the stepping motor 42 (see FIG. 3) of the display screen turning apparatus 20 (see FIG. 3) is driven. More specifically, the worm gear 47 mounted on the stepping motor 42 rotates along arrow E6 (see FIG. 7) following the drive of the stepping motor 42, and the drive gear 77 of the torque limiter 75 rotates along arrow E8 through the gear 43, as shown in FIG. 3. The driven gear 76 of the torque limiter 75 rotates along arrow E8 and the turning gear member 48 rotates along arrow E11 through the gears 44 and 45. Thus, the turning plate 31 on the base portion 30 mounted with the display screen support member 81 starts turning along arrow G1 as shown in FIG. 3 and hence the display body 10 (see FIG. 1) starts turning rightward (along arrow A in FIG. 1).

Figure 24:
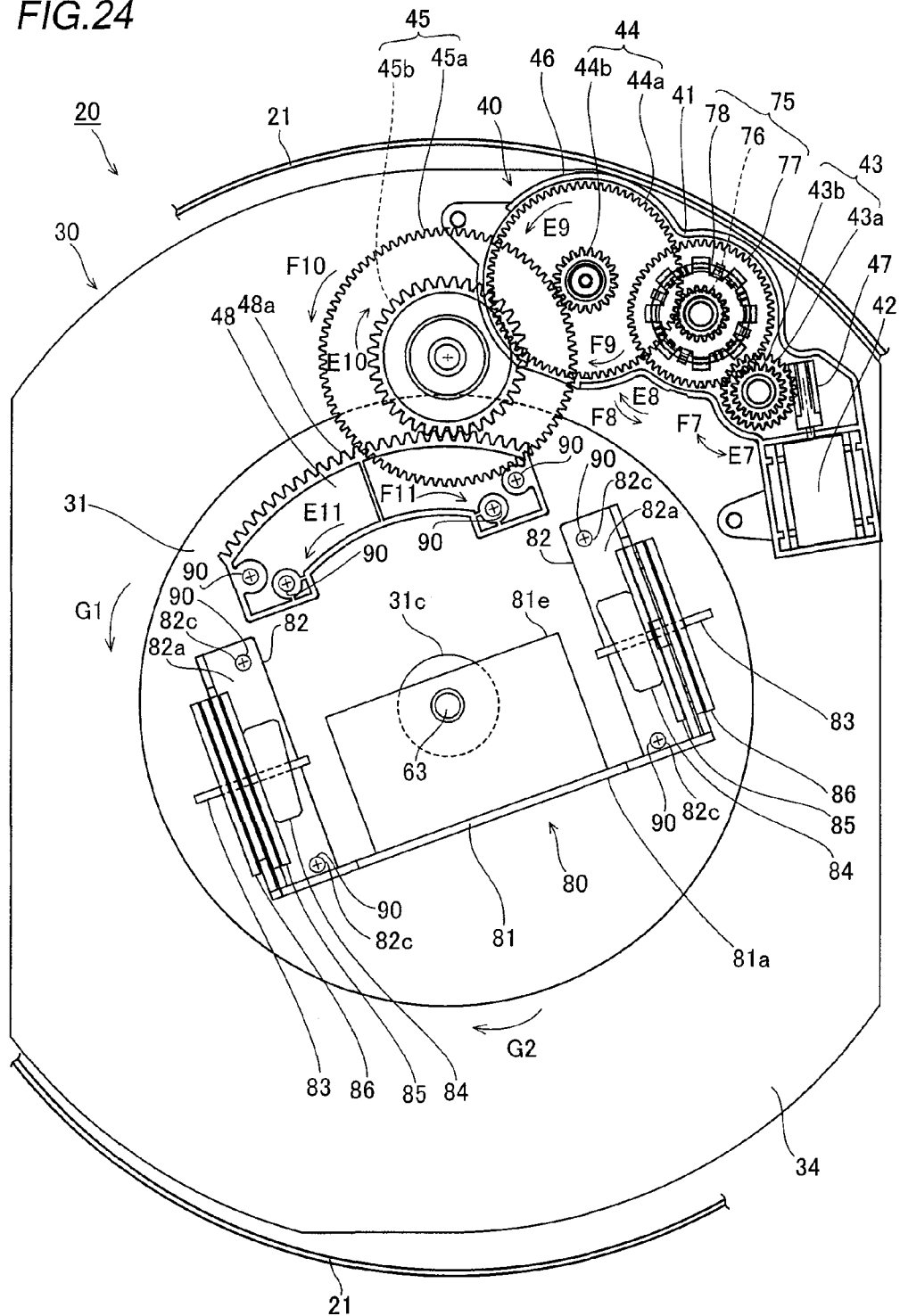
FIGS. 24 and 25 are diagrams for illustrating a turning operation of the display screen turning apparatus according to the embodiment of the present invention shown in FIG. 1 in a horizontal direction.

As shown in FIG. 24, the turning plate 31 on the base portion 30 placed with the display body 10 (see FIG. 1) continuously turns rightward (along arrow A in FIG. 1) at a prescribed rotational speed. Referring to FIG. 24, the vertical turn driving portion 50 (see FIG. 3) is not shown in the drawing in order to describe the turning operation of the turning plate 31 in the horizontal direction.

Figure 26:
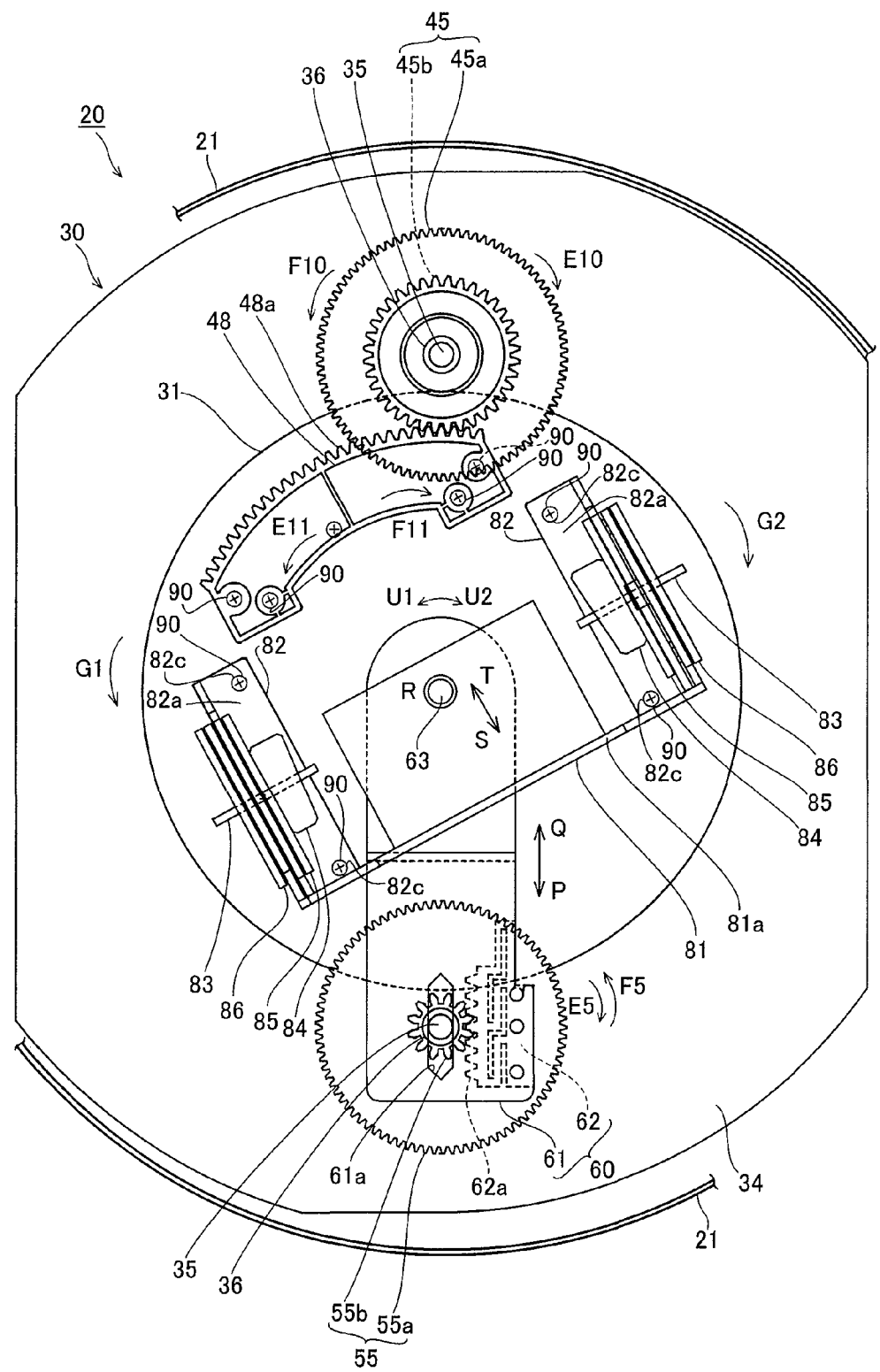
FIGS. 26 to 28 are diagrams for illustrating turning operations of the display screen turning apparatus according to the embodiment of the present invention shown in FIG. 1 in the anteroposterior (vertical) direction and the horizontal direction.

According to this embodiment, the coupling member 63 of the display screen support member 81 is located on the rotation center in the horizontal direction (along arrows G1 and G2) of the turning plate 31 and the display screen support member 81 as shown in FIG. 13, and hence the coupling member 63 does not move on the rotation center regardless of turning operation of the turning plate 31. Therefore, the rack plate 60 engaged with the coupling member 63 also does not linearly move (slide) along arrows P and Q and does not move (swing) along arrows U1 and U2 as shown in FIG. 26.

When the display body 10 is turned by an angle desired by the user, the user releases the press of the horizontal turn button (not shown) of the attached remote control (not shown) so that the signal turning the display body 10 (see FIG. 1) rightward (along arrow A in FIG. 1) is not transmitted to the control circuit portion (not shown) of the display body 10, and hence the drive of the stepping motor 42 is stopped. Thus, the base portion 30 stops turning along arrow G1 at a position shown in FIG. 24 and stands still.

In a state where the user continuously turns the display body 10 (see FIG. 1) rightward (along arrow A in FIG. 1), when the turning angle of the base portion 30 is maximum (30° in this embodiment), the turning plate 31 comes into contact with a stopper member (not shown) provided inside the base portion 30 to regulate the turning operation along arrow A (see FIG. 1). Therefore, the base portion 30 stops turning along arrow G1 at a position shown in FIG. 25 and stands still. At this time, the stepping motor 42 (see FIG. 25) continuously drives and hence driving torque transmitted from the stepping motor 42 (see FIG. 25) is transmitted to the drive gear 77 (see FIG. 25) of the torque limiter 75 (see FIG. 25) through the worm gear 47 (see FIG. 25) and the gear 43 (see FIG. 25).

Figure 25:
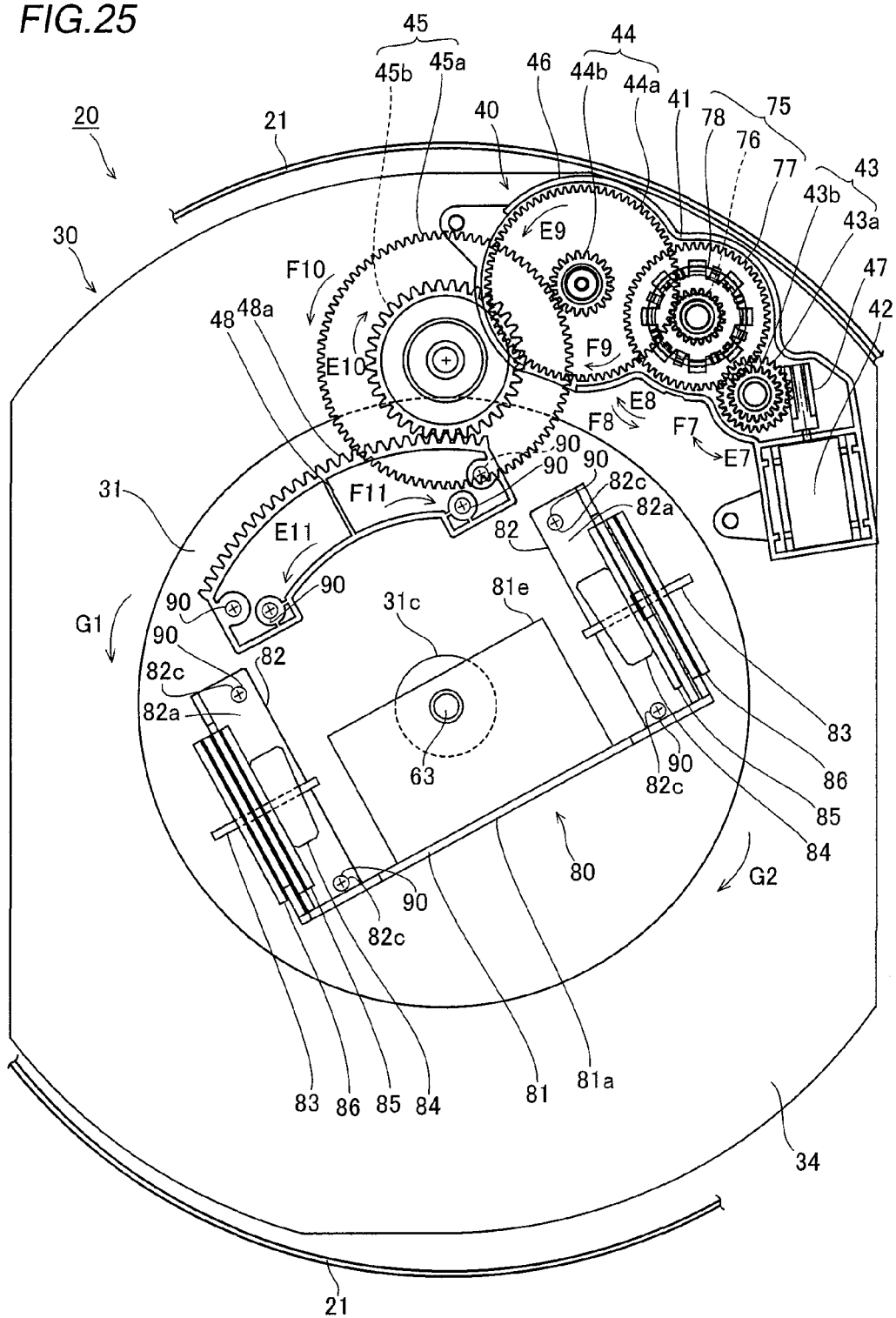

As shown in FIG. 7, the drive gear 77 is pressed against the driven gear 76 with the urging force previously set by the spring member 78, and therefore the inner peripheral surface of the drive gear 77 and the outer peripheral surface of the driven gear 76 slip so that the driving torque of the drive gear 77 is not transmitted to the driven gear 76, when driving torque, which is not less than the frictional force between the inner peripheral surface of the drive gear 77 and the outer peripheral surface of the driven gear 76 following the pressure contact force of the spring member 78, occurs with respect to the drive gear 77. In other words, when the turning plate 31 comes into contact with the stopper members (not shown), the driven gear 76, the gears 44 and 45 and the turning gear member 48 stop rotation regardless of the rotation of the drive gear 77. Referring to FIG. 25, the vertical turn driving portion 50 (see FIG. 3) is not shown in the drawing in order to describe the turning operation of the turning plate 31 in the horizontal direction similarly to FIG. 24.

While the base portion 30 is turned along arrow G1 shown in FIGS. 24 and 25 in the description of the aforementioned turning operation, the horizontal turn driving portion 40 turns similar to the aforementioned rotational operation also at the time of the turning operation of the turning plate 31 along arrow G2 opposite to arrow G1 and hence the display body 10 (see FIG. 1) is turned leftward (along arrow B in FIG. 1) by rotation of the turning plate 31 along arrow G2.

A turning operation of the turning the display body 10 (see FIG. 1) in the vertical direction (along arrows C and D in FIG. 1) in a state where the display body 10 vertically placed on the base portion 30 turns in the horizontal direction (along arrows A and B in FIG. 1) by a prescribed angle as shown in FIG. 4 will be now described.

Figure 27:
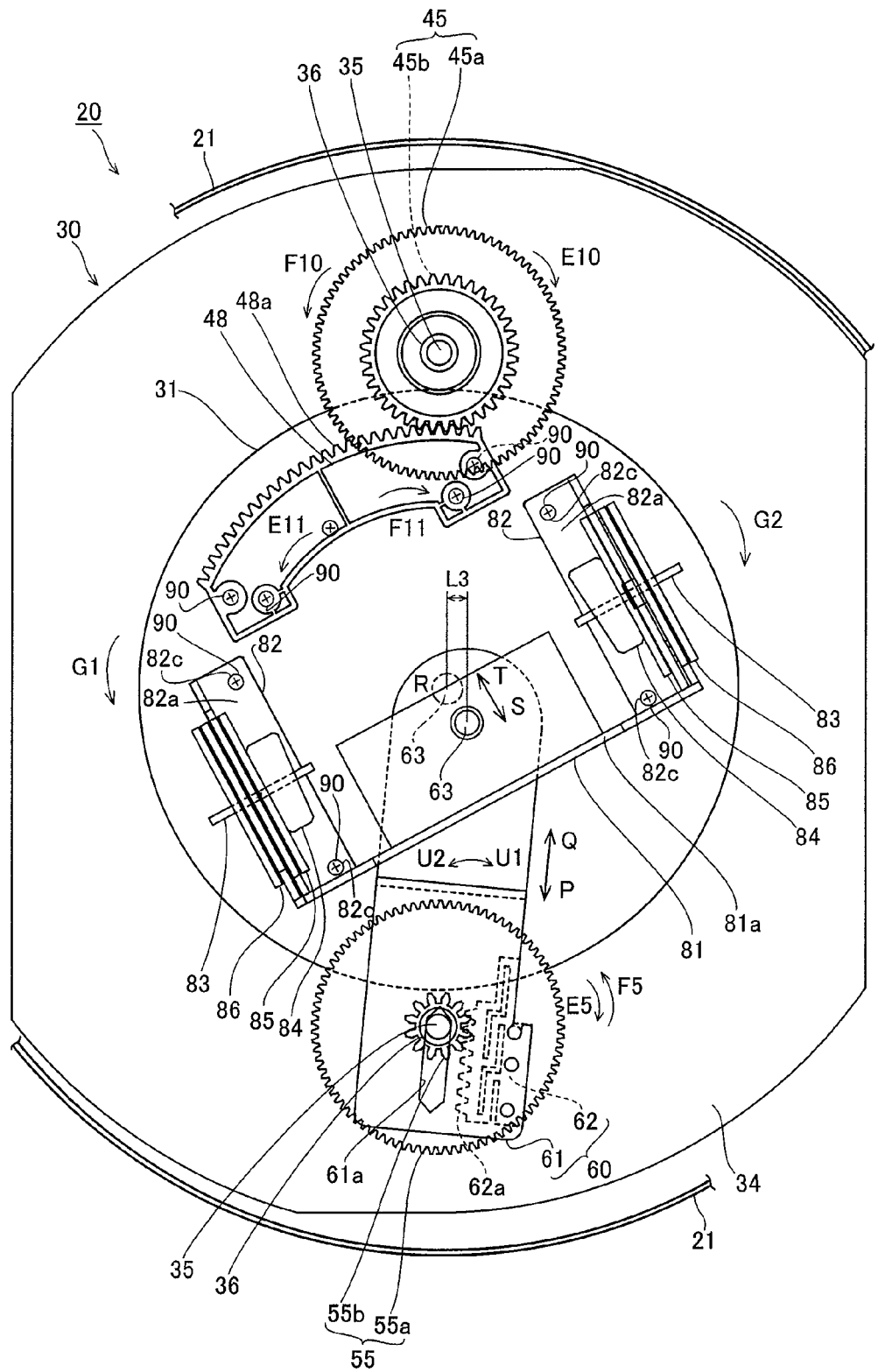

As shown in FIG. 26, the user presses the upward tilt button (not shown) of the attached remote control (not shown) in a state of turning the turning plate 31 on the base portion 30 rightward (along arrow G1) by the prescribed angle and stopping the turning operation at this position, the vertical turn driving portion 50 (see FIG. 3) starts driving similarly to the above. In other words, the rack plate 60 starts moving (sliding) along arrow P from a position shown in FIG. 26 to a position shown in FIG. 27. Referring to FIGS. 26 and 27, the horizontal turn driving portion 40 (see FIG. 3) and the vertical turn driving portion 50 (see FIG. 3) are not shown except of a part thereof in the drawing in order to describe an operation of the coupling member 63 of the rack plate 60 and the display screen support mechanism 80.

According to this embodiment, the coupling member 63 also gradually moves (rotates) from the position R shown in FIG. 26 to the position shown in FIG. 27 along arrow S following the movement of the rack plate 60 along arrow P, as shown in FIG. 27. At this time, the rack plate 60 rotates from the position shown in FIG. 26 to the position shown in FIG. 27 along arrow U1. The position of the coupling member 63 before rotation (position R in FIG. 26) is shown as an outer shape shown by a two-dot chain line (imaginary line) in FIG. 27. Therefore, the coupling member 63 engaged with the hole 61b of the rack plate 60 rotates along arrow C as shown in FIG. 19, and hence the display body 10 mounted on the display screen support member 81 starts turning upward (along arrow C).

At this time, the display screen support member 81 rotates along arrow C about the base portions 81g while the base portions 81g of the sectoral holes 81d of the display screen support member 81 and the upper surfaces of the support shafts 83 come into contact with each other, as shown in FIG. 14. The display screen support member 81 mounted with the display body 10 continuously turns along arrow C at the prescribed turning speed following the drive of the stepping motor 52 (see FIG. 18) as shown in FIG. 19.

When the display body 10 is turned upward (along arrow C in FIG. 19) by an angle desired by the user, the user releases the press of the upward tilt button (not shown) of the attached remote control (not shown) so that the signal turning the display body 10 (see FIG. 19) upward (along arrow C in FIG. 19) is not transmitted to the control circuit portion (not shown) of the display body 10. Therefore, the drive of the stepping motor 52 (see FIG. 18) is stopped. Thus, the display screen support member 81 stops turning along arrow C at the position shown in FIG. 19 and stands still.

In a state where the display body 10 (see FIG. 19) is continuously turned upward (along arrow C in FIG. 19) by the user, the first edges of the holes 81d of the display screen support member 81 come into contact with the support shafts 83 as shown in FIG. 20, whereby the display screen support member 81 reaches the prescribed turning angle (10° in this embodiment). Therefore, the display body 10 stops turning upward (along arrow C) at the position shown in FIG. 20 and stands still at this position. At this time, the rack plate 60 stands still in a state of moving from the moving start position R of the coupling member 63 (two-dot chain line) along arrow U1 by a horizontal distance L3, as shown in FIG. 27.

The stepping motor 52 (see FIG. 18) continuously drives and hence driving torque transmitted from the stepping motor 52 (see FIG. 18) is transmitted to the drive gear 72 (see FIG. 18) of the torque limiter 70 (see FIG. 18) through the worm gear 57 (see FIG. 18) and the gear 53 (see FIG. 18), but not transmitted to the driven gear 71 (see FIG. 18) with the torque limiter 70 (see FIG. 18). In other words, the driven gear 71, and the gears 54 and 55 stop rotation regardless of the rotation of the drive gear 72, when the rack plate 60 stops moving along arrow P as shown in FIG. 18.

Figure 28:
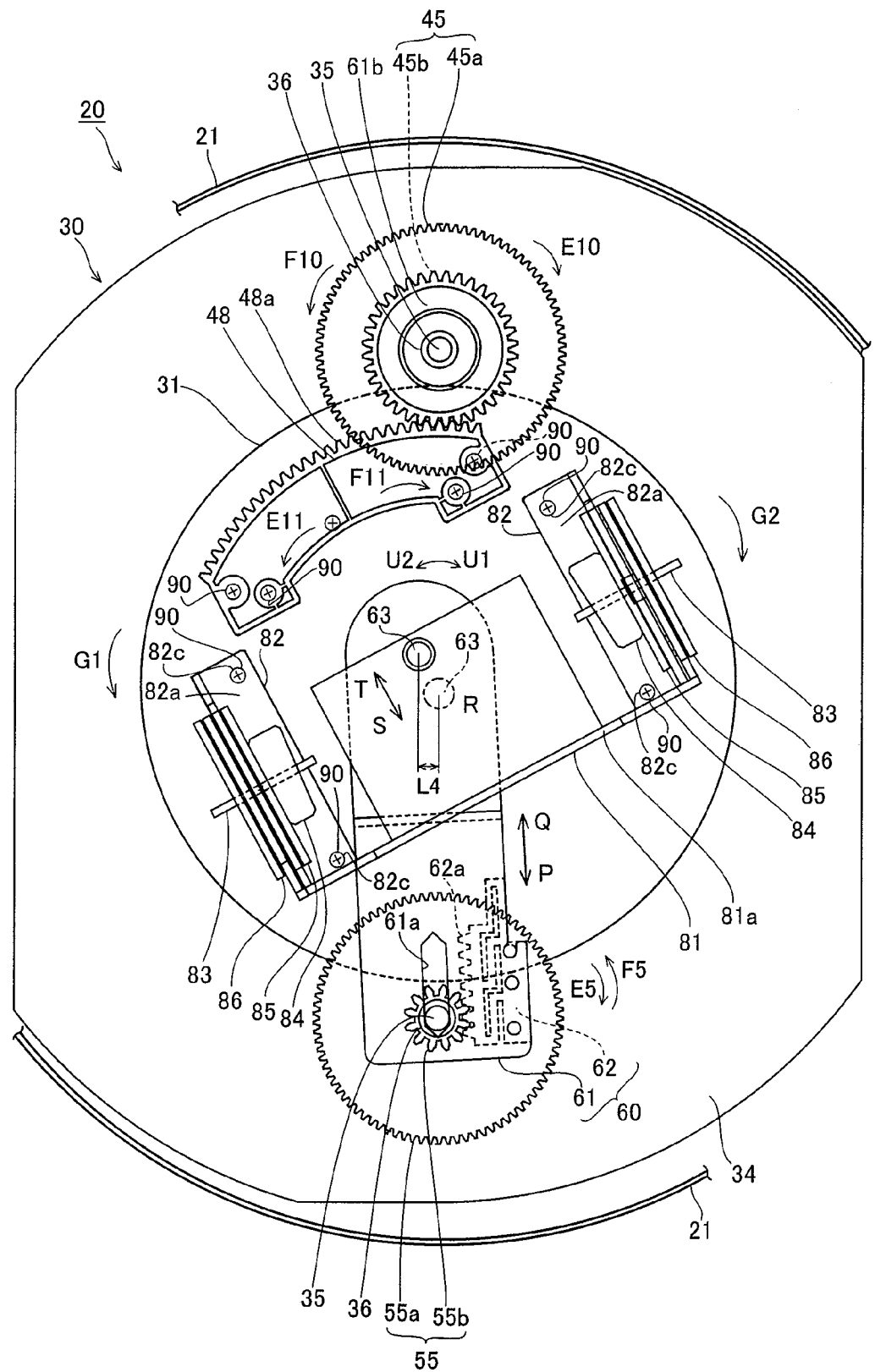

As shown in FIG. 25, the user presses the downward tilt button (not shown) of the attached remote control (not shown) in a state of turning the turning plate 31 on the base portion 30 rightward (along arrow G1) by a prescribed angle and stopping the turning operation at this position, whereby the vertical turn driving portion 50 starts driving similarly to the above. In other words, the rack plate 60 starts sliding along arrow Q as shown in FIG. 28. Referring to FIG. 28, the horizontal turn driving portion 40 (see FIG. 3) and the vertical turn driving portion 50 (see FIG. 3) are not shown except of a part thereof in the drawing in order to describe an operation of the coupling member 63 of the rack plate 60 and the display screen support mechanism 80, similarly to FIG. 27.

According to this embodiment, the coupling member 63 also gradually moves (rotates) from the position R shown in FIG. 26 to the position shown in FIG. 28 along arrow T following the movement of the rack plate 60 along arrow Q, as shown in FIG. 28. At this time, the rack plate 60 rotates from the position shown in FIG. 26 to the position shown in FIG. 28 along arrow U2. The position of the coupling member 63 before rotation (position R in FIG. 26) is shown as an outer shape shown by a two-dot chain line (imaginary line) in FIG. 28. Therefore, the coupling member 63 engaged with the hole 61*b* of the rack plate 60 rotates along arrow D as shown in FIG. 22, and hence the display body 10 mounted on the display screen support member 81 turns downward (along arrow D).

At this time, the display screen support member 81 rotates along arrow D about the base portions 81*g* while the base portions 81*g* of the sectoral holes 81*d* of the display screen support member 81 and the upper surfaces of the support shafts 83 come into contact with each other, as shown in FIG. 14. The display screen support member 81 mounted with the display body 10 continuously turns downward (along arrow D) at the prescribed turning speed following the drive of the stepping motor 52 (see FIG. 21) as shown in FIG. 22.

When the display body 10 is turned downward (along arrow D in FIG. 22) by an angle desired by the user, the user releases the press of the downward tilt button (not shown) of the attached remote control (not shown) so that the signal turning the display body 10 (see FIG. 22) downward (along arrow D in FIG. 22) is not transmitted to the control circuit portion (not shown) of the display body 10. Therefore the drive of the stepping motor 52 (see FIG. 21) is stopped. Thus, the display screen support member 81 stops turning along arrow D at the position shown in FIG. 22 and stands still.

In a state where the display body 10 (see FIG. 22) is continuously turned downward (along arrow D in FIG. 22) by the user, the second edges of the holes 81*d* of the display screen support member 81 come into contact with the support shafts 83 as shown in FIG. 23, whereby the display screen support member 81 reaches the prescribed turning angle (10° in this embodiment). Therefore, the display body 10 stops rotating downward (along arrow D) at the position shown in FIG. 23 and stands still at this position. At this time, the rack plate 60 stands still in a state of moving from the moving start position R of the coupling member 63 (shown by a two-dot chain line) along arrow U2 by a horizontal distance L4, as shown in FIG. 28.

Similarly to the above, the stepping motor 52 (see FIG. 21) continuously drives and hence driving torque transmitted from the stepping motor 52 (see FIG. 21) is transmitted to the drive gear 72 (see FIG. 21) of the torque limiter 70 (see FIG. 21) through the worm gear 57 (see FIG. 21) and the gear 53 (see FIG. 21), but is not transmitted to the driven gear 71 (see FIG. 21) with the torque limiter 70 (see FIG. 21). In other words, the driven gear 71 and the gears 54 and 55 stop rotation regardless of the rotation of the drive gear 72, when the rack plate 60 stops moving along arrow Q as shown in FIG. 21.

Similarly to the above, when the display body 10 (see FIG. 1) turns in the vertical direction (±10° along arrows C and D in FIG. 1), the rack plate 60 is also slightly displaced (deformed) in a direction in which the hole 61*b* of the plate member 61 moves upward from the horizontal position (position of the rack plate 60 in FIG. 4) following the rotation of the display screen support member 81 and the coupling member 63, as shown in FIGS. 20 and 23. The rack plate 60 further swings along arrows U1 and U2 to the positions shown in FIGS. 27 and 28. At this time, while the rack gear 62 fixed to the plate member 61 also gradually slightly moves up from the horizontal position and the engaging position between the gear portion 62*a* of the rack gear 62 and the gear portion 55*b* of the gear 55 are slightly changed. Also in this case, however, the gear portion 62*a* of the rack gear 62 is connected to the fixing portion 62*b* with the elastically deformable spring portions 62*e*, whereby the gear portion 62*a* is kept in the state of meshing with the gear portion 55*b* of the gear 55 in the horizontal direction by proper pressure contact force with no influence by three-dimensional displacement of the plate member 61. Therefore, the gear portion 62*a* of the rack gear 62 and the gear portion 55*b* of the gear 55 are always properly meshed with each other, and hence the driving force of the transmission gear portion 51 is smoothly transmitted to the rack plate 60.

While the display screen support member 81 vertically turns in the state of turning the turning plate 31 along arrow G1 shown in FIGS. 27 and 28 by the prescribed angle in the aforementioned description of the vertical turning operation of the display screen support member 81, the display screen support member 81 vertically turns with the vertical turn driving portion 50 similarly to the aforementioned turning operation also in the case of turning the turning plate 31 along arrow G2 opposite to the arrow G1 by the prescribed angle so that the display body 10 (see FIG. 1) turns downward (along arrow D in FIG. 1).

While the display body 10 vertically placed on the base portion 30 first turns in the horizontal direction (along arrows A and B in FIG. 1) by the prescribed angle and then the display body 10 (see FIG. 1) turns in the vertical direction (along arrows C and D in FIG. 1) in the description of the aforementioned turning operation, contrary to this, the display body 10 can be turned to a position desired by the user by performing operations similar to the aforementioned operations of the horizontal turn driving portion 40 (see FIG. 3) and the vertical turn driving portion 50 (see FIG. 3) also in a case where the display body 10 (see FIG. 1) first turns in the vertical direction (along arrows C and D in FIG. 1) and then turns in the horizontal direction (along arrows A and B in FIG. 1) by the prescribed angle.

According to this embodiment, as hereinabove described, the display screen turning apparatus 20 comprises the stepping motor 52 arranged inside the base portion 30 and the transmission gear portion 51 for transmitting the driving force of the stepping motor 52, arranged inside the base portion 30, whereby both the transmission gear portion 51 and the stepping motor 52 serving as the driving source of the transmission gear portion 51 can be housed inside the base portion 30 and hence the transmission gear portion 51 large in size can be easily arranged, dissimilarly to a case where both the transmission gear portion 51 difficult to be downsized and the stepping motor 52 serving as the driving source of the transmission gear portion 51 are arranged outside the base portion 30.

According to this embodiment, the display screen turning apparatus 20 comprises the display screen support member 81 supporting the display body 10 rotatably in the horizontal direction (along arrows A and B in FIG. 1) in the horizontal plane and rotatably in the anteroposterior direction (along arrows C and D in FIG. 1) with respect to the vertical plane, the rack plate 60 arranged on the base portion 30 and including the rack gear 62 meshed with the transmission gear portion 51 in the horizontal direction and the coupling member 63 coupling the rack plate 60 rotatably in the horizontal direction (along arrows A and B in FIG. 1) in the horizontal plane with respect to the display screen support member 81, and the display screen support member 81 rotates in the vertical direction (along arrows C and D in FIG. 1) by the prescribed angle with respect to the vertical plane through the coupling member 63 coupled to the rack plate 60 following reciprocation of the rack plate 60 along arrows P and Q (see FIG. 3) in the horizontal plane by the normal and reverse rotation (rotation along arrows E1 and F1 in FIG. 6) of the stepping motor 52, whereby the own weight of the display body 10 is applied to the turning plate 31 through the display screen support member 81 regardless of the time of the stop of the display body 10 and the time of the turning operation of the display body 10, while not applied to the transmission gear portion 51 including the gear portion 55 meshed through the rack plate 60 and the rack gear 62 in the horizontal direction, and hence the driving force of the stepping motor 52 can be smoothly transmitted with the transmission gear portion 51.

According to this embodiment, the display screen turning apparatus 20 comprises the boss member 35 provided on the base portion 30 and reciprocably supporting the rack plate 60 in the horizontal plane, and the rack plate 60 is capable of reciprocating in the horizontal plane by movably supporting the rack plate 60 with respect to the boss member 35, whereby the rack plate 60 is reciprocated through the rack gear 62 in the state of being supported by the boss member 35 and hence the display screen support member 81 engaged with the rack plate 60 can be stably rotated.

According to this embodiment, the rack plate 60 includes the slot-shaped long hole 61*a* extending substantially parallel to the direction in which the rack plate 60 reciprocates in the horizontal plane and the long hole 61*a* receives the boss member 35 on the base portion 30 so that the rack plate 60 is movably supported with respect to the boss member 35, whereby the rack plate 60 can be reciprocated limiting in the range of the longitudinal length of the long hole 61*a* receiving the boss member 35 on the base portion 30 and hence the display screen support member 81 can be easily rotated in the anteroposterior direction by the prescribed angle.

According to this embodiment, the rack plate 60 is so formed as to be swingable along arrows U1 and U2 (see FIG. 3) in the horizontal plane following the rotation of the display screen support member 81 in the horizontal direction (along arrows A and B in FIG. 1) in the horizontal plane in addition to the reciprocation along arrows P and Q (see FIG. 3) in the horizontal plane, whereby the rack plate 60 can be swung along arrows U1 and U2 (see FIG. 3) in the horizontal plane in addition to the reciprocation along arrows P and Q (see FIG. 3) in the horizontal plane also when the display screen support member 81 is rotated in the anteroposterior direction (along arrows C and D in FIG. 4) with respect to the vertical plane 350 in the state where the display screen support member 81 is rotated in the horizontal direction (along arrows A and B in FIG. 1) in the horizontal plane. Thus, the display screen support member 81 can be easily rotated in the anteroposterior direction (along arrows C and D in FIG. 4) without deforming the rack plate 60 due to twist.

According to this embodiment, the rack gear 62 has the gear portion 62*a* meshed with the transmission gear portion 51 in the horizontal direction, the fixing portion 62*b* for fixing the rack gear 62 to the rack plate 60, and the spring portions 62*e* connecting the gear portion 62*a* and the fixing portion 62*b* so as to allow change of the distance between the gear portion 62*a* and the fixing portion 62*b*, whereby the spring portions 62*e* of the rack gear 62 fixed to the rack plate 60 absorbs the change in a direction in which the distance W (see FIG. 12) between the gear portion 62*a* and the fixing portion 62*b* when the rack plate 60 swings following the turn of the display screen support member 81 in the horizontal plane in addition to the reciprocation in the horizontal plane and hence the rack plate 60 can be swung along arrows U1 and U2 (see FIG. 3) without applying excessive external force to the mesh between the transmission gear portion 51 and the rack gear 62. Thus, reliability of the display screen turning apparatus 20 can be improved.

According to this embodiment, the two notches 62*c* and the one notch 62*d* form the spring portions 62*e* of the rack gear 62 on the regions where the gear portion 62*a* and the fixing portion 62*b* are connected to each other in the rack gear 62 so that the spring portions 62*e* has an elastically deformable shape, whereby the elastically deformable spring portions 62*e* are integrally formed with the rack gear 62 dissimilarly to a case of separately providing a dedicated elastically deformable spring member to the rack gear 62 and hence the number of the components can be inhibited from increase.

According to this embodiment, the transmission gear portion 51 includes the torque limiter 70 interrupting the driving force of the stepping motor 52 when the driving force of the stepping motor 52 exceeds a prescribed value, whereby the driving force of the stepping motor 52 continuously rotating can be interrupted with the torque limiter 70 when the vertical turn of the display body 10 is blocked by abrupt external force or the like, or when the turning angle of the display body 10 reaches maximum value to stop the turning operation, and hence the driving force of the stepping motor 52 can not be transmitted to the transmission gear portion 51. Therefore, the transmission gear portion 51 can be inhibited from being broken due to excessive rotation when the driving force of the stepping motor 52 exceeds the prescribed torque.

According to this embodiment, the stepping motor 52 is constituted such that the driving force of the stepping motor 52 is transmitted to the transmission gear portion 51 through the worm gear 57 press-fitted into the driving axis of the stepping motor 52, whereby the worm gear 57 can not be rotated with rotation of the gears 55 and 54, the torque limiter 70 and the gear 53 also when the transmission gear portion 51 is sequentially driven in the order of the gears 55 and 54, the torque limiter 70 and the gear 53 following the turn of the display body 10 due to abrupt external force and hence the stepping motor 52 can be inhibited from reversely driving with driving force other than the driving force of the stepping motor 52.

According to this embodiment, the display screen support member 81 includes the hole 81*f* coupling the coupling member 63, and the hole 81*f* of the display screen support member 81 is provided on the vertical segment 300 (shown by a one-dot chain line in FIG. 4) passing through the rotation center in the rotational direction (along arrows G1 and G2 in FIG. 3) in the horizontal plane of the display screen support member 81, whereby the coupling member 63 is located on the rotation center (position R in FIG. 3) in the rotational direction (along arrows G1 and G2 in FIG. 3) in the horizontal plane of the display screen support member 81 also when the display body 10 turns in the horizontal direction (along arrows A and B in FIG. 1) in the horizontal plane and hence the rack plate 60 does not swing in the direction (along arrows U1 and U2 in FIG. 3) intersecting with the moving direction in the horizontal plane (along arrows P and Q in FIG. 3). The coupling member 63 starts moving (rotating) in the direction (along arrows S and T in FIG. 26) for rotating the display body 10 in the vertical direction with reference to the rotation center (position R in FIG. 26) in rotating in the horizontal plane only when the display body 10 turns in the vertical direction (along arrows C and D in FIG. 1) from the state of turning in the horizontal direction (along arrows A and B in FIG. 1) in the horizontal plane, and hence the rack plate 60 coupled to the coupling member 63 moves (swings) in the swing range in which substantial forward (along arrow P in FIG. 26) and rearward (along arrow Q in FIG. 26) directions are substantially equal to each other with reference to the rotation center (position R in FIG. 26) at which the coupling member 63 starts moving. Therefore, the swing range of the rack plate 60 in the horizontal plane (within the horizontal distance L3 in FIG. 27 and the horizontal distance L4 in FIG. 28 with reference to the position R in FIG. 26) when turning the display body 10 in the vertical direction can be minimally-suppressed.

According to this embodiment, the rack plate 60 includes the hole 61b rotatably supporting the coupling member 63 in horizontal direction (along arrows A and B in FIG. 1) in the horizontal plane and in the vertical direction (direction substantially perpendicular to arrow P in FIG. 10 and arrow Q in FIG. 11) with respect to the vertical plane, and the inner side surface 61c of the hole 61b of the rack plate 60 is formed in a tapered shape such that the hole size thereof increases toward the display screen support member 81 when coupling the rack plate 60 and the display screen support member 81 with the coupling member 63, whereby the coupling member 63 is easily rotated in the vertical direction (along arrows C and D in FIG. 1) due to the shape of the inner side surface 61c of the hole 61b of the rack plate 60 when turning the display body 10 in the vertical direction (along arrows C and D in FIG. 1) with respect to the vertical plane. Therefore, the display screen support member 81 can smoothly turn in the state where the rack plate 60 and the display screen support member 81 are coupled with the coupling member 63.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus is provided in the liquid crystal television employed as an exemplary display in the aforementioned embodiment, the present invention is not restricted to this but the display screen turning apparatus may be provided in a display having a display screen portion (display panel) other than the liquid crystal panel such as an organic EL panel.

While the coupling member 63 is made by a member formed separately from the rack plate 60 and the coupling member 63 is inserted into the hole 61b of the rack plate 60 and mounted on the arm portion 81e of the display screen support member 81 by caulking in the aforementioned embodiment, the present invention is not restricted to this but the coupling portion integrally formed with the plate member by partially uprighiting from the plate member of the rack plate may be alternatively provided in stead of the coupling member 63 so that the coupling portion of the plate member rotataby engaged with the arm portion of the display screen support member.

While the stepping motors 42 and 52 are provided as the driving sources of the horizontal turn driving portion 40 and the vertical turn driving portion 50 in the aforementioned embodiment, the present invention is not restricted to this but both the horizontal turn driving portion and the vertical turn driving portion may be alternatively driven with one driving source.

While the rack plate 60 is mounted on the plate member 61 made of sheet metal with the rack gear 62 made of resin with the screw 90 in the aforementioned embodiment, the present invention is not restricted to this but a rack plate obtained by integrally forming a plate portion and a rack gear portion by sheet metal working or resin molding may be alternatively applied.

While the display body 10 turns (rotates) in the horizontal direction (along arrows A and B in FIG. 1) in the horizontal plane by 30° respectively and turns (rotates) in the vertical direction (along arrows C and D FIG. 1) with respect to the vertical plane by 10° respectively in the aforementioned embodiment, the present invention is not restricted to this but the display body may be alternatively turn (rotate) in the horizontal direction by the prescribed turning angle other than 30° and turn (rotate) in the vertical direction by the prescribed turning angle other than 10°.

What is claimed is:

1. A display screen turning apparatus comprising:
a base portion for placing a display screen portion thereon;
a driving source arranged inside said base portion;
a transmission gear portion for transmitting driving force of said driving source, arranged inside said base portion;
a display screen support member supporting said display screen portion rotatably in a horizontal plane and rotatably in an anteroposterior direction with respect to a vertical plane;
a rack plate arranged on said base portion and including a rack gear meshed with said transmission gear portion in a horizontal direction; and
a coupling portion rotatably coupling said rack plate in said horizontal plane with respect to said display screen support member, wherein
said display screen support member is rotated in the anteroposterior direction with respect to said vertical plane by a prescribed angle through said coupling portion coupled to the said rack plate following reciprocation of said rack plate in said horizontal plane with normal and reverse rotation of said driving source.

2. The display screen turning apparatus according to claim 1, further comprising a support shaft provided on said base portion and reciprocably supporting said rack plate in said horizontal plane, wherein
said rack plate is movably supported with respect to said support shaft so that said rack plate can be reciprocated in said horizontal plane.

3. The display screen turning apparatus according to claim 2, wherein
said rack plate includes a slot-shaped support hole extending substantially parallel to a direction in which said rack plate reciprocates in said horizontal plane, and
said support shaft on said base portion is inserted into said support hole of said rack plate so that said rack plate is movably supported with respect to said support shaft.

4. The display screen turning apparatus according to claim 1, wherein said rack plate is swingable in said horizontal plane following rotation of said display screen support member in said horizontal plane in addition to reciprocation in said horizontal plane.

5. The display screen turning apparatus according to claim 1, wherein
said rack gear has a gear portion meshed with said transmission gear portion in the horizontal direction, a fixing portion for fixing said rack gear to said rack plate, and a connecting portion connecting said gear portion and said fixing portion so as to allow change of a distance between said gear portion and said fixing portion.

6. The display screen turning apparatus according to claim 5, wherein
a region connecting said gear portion and said fixing portion in said rack gear is cut out into a prescribed shape so that said connecting portion of said rack gear has an elastically deformable shape.

7. The display screen turning apparatus according to claim 1, wherein
said transmission gear portion includes a torque limiter interrupting the driving force of said driving source when the driving force of said driving source exceeds a prescribed value.

8. The display screen turning apparatus according to claim 1, wherein
said driving source transmits the driving force of said driving source to said transmission gear portion through a worm gear provided on a driving axis of said driving source.

9. The display screen turning apparatus according to claim 1, wherein
said display screen support member includes a first hole to which said coupling portion is coupled, and
said first hole of said display screen support member is provided on a vertical segment passing a rotation center in said horizontal plane of said display screen support member.

10. The display screen turning apparatus according to claim 1, wherein
said rack plate further includes a second hole supporting said coupling portion rotatably in said horizontal plane and rotatably in the anteroposterior direction with respect to said vertical plane, and
an inner side surface of said second hole of said rack plate is formed in a tapered shape such that the hole size thereof increases toward said display screen support member when coupling said rack plate and said display screen support member with said coupling portion.

11. A display screen turning apparatus comprising:
a base portion for placing a display screen portion thereon;
a driving source arranged inside said base portion;
a transmission gear portion for transmitting driving force of said driving source through a worm gear provided on a driving axis of said driving source, arranged inside said base portion and including a torque limiter interrupting the driving force of said driving source when the driving force of said driving source exceeds a prescribed value;
a display screen support member provided with a first hole and supporting said display screen portion rotatably in a horizontal plane and rotatably in an anteroposterior direction with respect to a vertical plane;
a rack plate arranged on said base portion and including a rack gear meshed with said transmission gear portion in a horizontal direction and a second hole; and
a coupling portion rotatably coupling said rack plate in said horizontal plane with respect to said display screen support member through said first hole and said second hole, wherein
said display screen support member is rotated in the anteroposterior direction with respect to said vertical plane by a prescribed angle through said coupling portion coupled to the said rack plate following reciprocation of said rack plate in said horizontal plane with normal and reverse rotation of said driving source,
said rack plate is swingable in said horizontal plane following rotation of said display screen support member in said horizontal plane in addition to reciprocation in said horizontal plane,
said first hole of said display screen support member is provided on a vertical segment passing a rotation center in said horizontal plane of said display screen support member, and
said second hole of said rack plate supports said coupling portion rotatably in said horizontal plane and rotatably in the anteroposterior direction with respect to said vertical plane and an inner side surface of said second hole is formed in a tapered shape such that the hole size thereof increases toward said display screen support member.

12. The display screen turning apparatus according to claim 11, further comprising a support shaft provided on said base portion and reciprocably supporting said rack plate in said horizontal plane, wherein
said rack plate is movably supported with respect to said support shaft so that said rack plate can be reciprocated in said horizontal plane.

13. The display screen turning apparatus according to claim 12, wherein
said rack plate includes a slot-shaped support hole extending substantially parallel to a direction in which said rack plate reciprocates in said horizontal plane, and
said support shaft on said base portion is inserted into said support hole of said rack plate so that said rack plate is movably supported with respect to said support shaft.

14. The display screen turning apparatus according to claim 11, wherein
said rack gear has a gear portion meshed with said transmission gear portion in the horizontal direction, a fixing portion for fixing said rack gear to said rack plate, and a connecting portion connecting said gear portion and said fixing portion so as to allow change of a distance between said gear portion and said fixing portion.

15. The display screen turning apparatus according to claim 14, wherein
a region connecting said gear portion and said fixing portion in said rack gear is cut out into a prescribed shape so that said connecting portion of said rack gear has an elastically deformable shape.

* * * * *